(12) United States Patent
Tashino et al.

(10) Patent No.: US 6,878,659 B2
(45) Date of Patent: Apr. 12, 2005

(54) SOLID CATALYST COMPONENT FOR OLEFIN POLYMERIZATION AND CATALYST

(75) Inventors: Kunihiko Tashino, Chigasaki (JP); Isa Nishiyama, Chigasaki (JP); Takuma Yoshida, Chigasaki (JP); Yukihiro Suzuki, Chigasaki (JP); Hayashi Ogawa, Chigasaki (JP); Maki Sato, Chigasaki (JP)

(73) Assignee: Toho Titanium Co., Ltd., Chigasaki (JP)

( * ) Notice: Subject to any disclaimer, the term of this patent is extended or adjusted under 35 U.S.C. 154(b) by 298 days.

(21) Appl. No.: 10/030,120

(22) PCT Filed: May 24, 2001

(86) PCT No.: PCT/JP01/04347

§ 371 (c)(1),
(2), (4) Date: Jan. 24, 2002

(87) PCT Pub. No.: WO01/90200

PCT Pub. Date: Nov. 29, 2001

(65) Prior Publication Data

US 2004/0072681 A1 Apr. 15, 2004

(30) Foreign Application Priority Data

| May 24, 2000 | (JP) | 2000-153729 |
| May 24, 2000 | (JP) | 2000-153730 |
| May 24, 2000 | (JP) | 2000-153731 |
| May 24, 2000 | (JP) | 2000-153732 |
| May 24, 2000 | (JP) | 2000-153733 |
| Sep. 29, 2000 | (JP) | 2000-298767 |

(51) Int. Cl.$^7$ .......................... B01J 31/00; B01J 37/00; C08F 4/02; C08F 4/60

(52) U.S. Cl. .................. 502/118; 502/115; 502/116; 502/122; 502/125; 502/127; 502/132; 502/134

(58) Field of Search .................. 502/115, 116, 502/118, 122, 125, 127, 132, 134

(56) References Cited

U.S. PATENT DOCUMENTS

| 4,143,223 A | | 3/1979 | Toyota et al. | |
| 4,814,312 A | * | 3/1989 | Murata et al. | 502/111 |
| 4,950,630 A | * | 8/1990 | Murata et al. | 502/116 |
| 4,960,741 A | | 10/1990 | Bailly et al. | |
| 5,162,277 A | * | 11/1992 | Job | 502/124 |
| 5,185,410 A | * | 2/1993 | Job | 526/128 |
| 5,229,344 A | * | 7/1993 | Job | 502/171 |
| 5,281,567 A | * | 1/1994 | Job | 502/120 |
| 5,494,872 A | * | 2/1996 | Hosaka et al. | 502/115 |

(Continued)

FOREIGN PATENT DOCUMENTS

| EP | 30742 | 6/1981 |
| EP | 45977 | 2/1982 |
| EP | 101136 | 2/1984 |
| EP | 896969 | 2/1999 |
| JP | 61-207403 | 9/1986 |
| JP | 4-233921 | 8/1992 |

*Primary Examiner*—Mark L. Bell
*Assistant Examiner*—Jennine M. Brown
(74) *Attorney, Agent, or Firm*—Oblon, Spivak, McClelland, Maier & Neustadt, P.C.

(57) ABSTRACT

A solid catalyst component for olefin polymerization characterized by being formed from (a) a magnesium compound, (b) titanium tetrachloride, (c) a phthalic diester and a derivative thereof, and either (d$^1$) a hydroxylated hydrocarbon compound (phenol, etc.) represented by a specific formula or (d$^2$) a mercapto-containing hydrocarbon compound (thiophenol, etc.) represented by a specific formula. With a catalyst obtained from this solid catalyst component, an olefin polymer can be obtained in extremely high yield. In particular, a propylene polymer which retains high stereo-regularity can be obtained in extremely high yield.

14 Claims, 1 Drawing Sheet

U.S. PATENT DOCUMENTS

| | | | |
|---|---|---|---|
| 5,567,665 A | * 10/1996 | Wagner et al. | 502/9 |
| 5,604,172 A | * 2/1997 | Wagner et al. | 502/120 |
| 5,962,361 A | * 10/1999 | Zum Mallen | 502/107 |
| 6,156,690 A | * 12/2000 | Hosaka | 502/118 |
| 6,228,791 B1 | * 5/2001 | Kataoka et al. | 502/115 |
| 6,228,793 B1 | * 5/2001 | Hosaka et al. | 502/125 |
| 6,388,028 B2 | * 5/2002 | Sacchetti et al. | 526/124.3 |
| 6,627,710 B1 | * 9/2003 | Sacchetti et al. | 526/112 |

* cited by examiner

SOLID CATALYST COMPONENT FOR OLEFIN POLYMERIZATION AND CATALYST

FIELD OF THE INVENTION

The present invention relates to a solid catalyst component and a catalyst for polymerization of olefins, which can produce olefin polymers in a very high yield while retaining high stereoregularity of the olefin polymers.

BACKGROUND ART

Conventionally, a solid catalyst component containing magnesium, titanium, an electron donor compound, and halogen as essential components used for the polymerization of olefins has been known. A number of methods for polymerizing or copolymerizing olefins in the presence of an olefin polymerization catalyst consisting of the above solid catalyst component, an organoaluminum compound, and an organosilicon compound have been proposed. For example, Japanese Unexamined Patent Publication No. (hereinafter referred to as JP-A) 98045/1977 discloses a method of polymerizing olefins having 3 or more carbon atoms using a catalyst comprising solid catalyst component containing a magnesium halide, a titanium halide, an electron donor such as a diester compound (e.g., an organic carboxylic acid ester), and an organoaluminum compound.

JP-A 19395/1978 discloses a solid catalyst component for olefin polymerization containing an acyl halide, magnesium dihalide, halogen-containing titanium compound, and an alcoholic and/or phenol compound. The catalyst component was proven to be successful to some extent in producing a polymer with excellent mechanical characteristics and moldability in a high yield.

However, this solid catalyst component does not necessarily exhibit sufficiently high catalyst activity which can satisfy recent various requirements for production of olefin polymers, such as low production cost, improved process performance, and capability of manufacturing polymers with sophisticated functions at a high efficiency. Further improvement of the catalyst to satisfy these requirements has been strongly desired.

Accordingly, an object of the present invention is to solve such problems remaining in the prior art and to provide a solid catalyst component and a catalyst for polymerization of olefins, which can produce olefin polymers in a very high yield, in particular, which can produce propylene polymers in a very high yield while retaining high stereoregularity.

DISCLOSURE OF THE INVENTION

As a result of extensive studies to solve the above-mentioned problems in the prior art, the present inventors have found that a solid catalyst component comprising a magnesium compound, titanium tetrachloride, a phthalic acid diester or a derivative thereof, and a hydroxyl group-containing hydrocarbon compound or mercapto group-containing hydrocarbon compound exhibit very high activity in the polymerization of olefins, particularly in the polymerization of propylene and produce propylene polymers with a high stereoregularity in a high yield. This finding has led to the completion of the present invention.

Specifically, the present invention provides a catalyst component for polymerization of olefins comprising (a) a magnesium compound, (b) titanium tetrachloride, (c) a phthalic acid diester or a derivative thereof, and (d$^1$) a hydroxyl group-containing hydrocarbon compound having the following formula (1):

$$(R^1)_m X^1(OH)_n \qquad (1)$$

wherein $R^1$ is an alkyl group having 1 to 10 carbon atoms, a cycloalkyl group having 3 to 10 carbon atoms, or a halogen atom, m, which indicates the number of $R^1$, is 0, 1, or 2, provided that when m is 2, the two $R^1$ groups may be either identical or different, n, which indicates the number of the OH group, is 1, 2, or 3, and $X^1$ represents a group obtainable by removing (m+n) hydrogen atoms from benzene, cyclopentane, cyclohexane, or naphthalene.

The present invention further provides a catalyst component for polymerization of olefins comprising (a) a magnesium compound, (b) titanium tetrachloride, (c) a phthalic acid diester or a derivative thereof, and (d$^2$) a mercapto group-containing hydrocarbon compound having the following formula (2):

$$(R^2)_s X^2(SH)_t \qquad (2)$$

wherein $R^2$ is an alkyl group having 1 to 10 carbon atoms, a cycloalkyl group having 3 to 10 carbon atoms, or a halogen atom, s, which indicates the number of $R^2$, is 0, 1, or 2, provided that when s is 2, the two $R^2$ groups may be either identical or different, t, which indicates the number of the SH group, is 1 or 2, and $X^2$ represents a group obtainable by removing (s+t) hydrogen atoms from benzene.

The present invention further provides a catalyst for polymerization of olefins comprising:

(A) the above-mentioned solid catalyst component (hereinafter referred to as "component (A)"), (B) an organoaluminum compound of the following formula (4), $$R^6_p AlQ_{3-p} \qquad (4)$$

wherein $R^6$ is an alkyl group having 1 to 4 carbon atoms, Q is a hydrogen atom or a halogen atom, and p is a real number satisfying an inequality 0<p≦3, and (C) an organosilicon compound of the following general formula (5):

$$R^7_q Si(OR^8)_{4-q} \qquad (5)$$

wherein $R^7$ may be either identical or different, individually representing an alkyl group having 1 to 12 carbon atoms, a cycloalkyl group, a phenyl group, a vinyl group, an allyl group, or an aralkyl group, $R^8$ may be either identical or different, individually representing an alkyl group having 1 to 4 carbon atoms, a cycloalkyl group, a phenyl group, a vinyl group, an allyl group, or an aralkyl group, and q is an integer satisfying an inequality of 0≦q≦3.

BEST MODE FOR CARRYING OUT THE INVENTION

Figure 1:
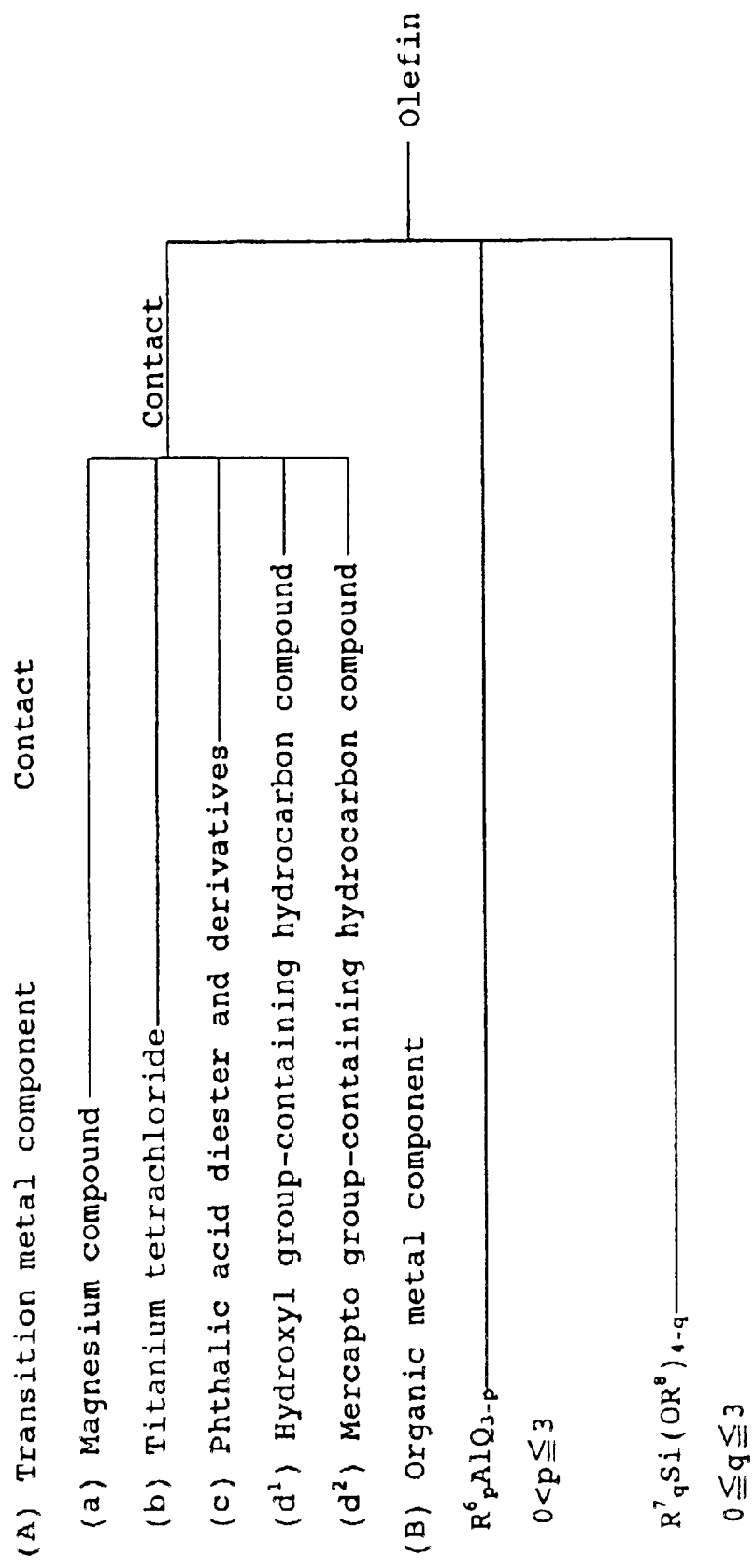
FIG. 1 is a flow chart showing a process for preparing the polymerization catalyst of the present invention.

The magnesium compounds (hereinafter referred to from time to time simply as "component (a)") used in the preparation of the solid catalyst component (A) for the polymerization of olefins in the present invention include magnesium dihalide, dialkyl magnesium, alkylmagnesium halide, dialkoxy magnesium, diaryloxy magnesium, alkoxyl magnesium halide, fatty acid magnesium, and the like.

Specific examples of the magnesium dihalide include magnesium dichloride, magnesium dibromide, magnesium diiodide, magnesium difluoride, and the like.

A compound represented by the formula $R^9R^{10}Mg$, wherein $R^9$ and $R^{10}$ may be either identical or different, individually representing an alkyl group having 1 to 10 carbon atoms, is preferable as the dialkyl magnesium. Specific compounds include dimethyl magnesium, diethyl magnesium, methylethyl magnesium, dipropyl magnesium, methylpropyl magnesium, ethylpropyl magnesium, dibutyl magnesium, methylbutyl magnesium, ethylbutyl magnesium, and the like. These dialkyl magnesium compounds may be prepared by reacting metallic magnesium with a hydrocarbon halide or an alcohol.

A compound represented by the formula $R^{11}MgD^1$, wherein $R^{11}$ represents an alkyl group having 1 to 10 carbon atoms and $D^1$ represents a halogen atom, is preferable as an alkyl magnesium halide. Specific examples are ethyl magnesium chloride, propyl magnesium chloride, butyl magnesium chloride, and the like. These magnesium halide compounds may be prepared by reacting metallic magnesium with a hydrocarbon halide or an alcohol.

A compound represented by the formula $Mg(OR^{12})(OR^{13})$, wherein $R^{12}$ and $R^{13}$ may be either identical or different, individually representing an alkyl group having 1 to 10 carbon atoms or an aryl group, is preferable as a dialkoxy magnesium or diaryloxy magnesium. Specific compounds include dimethoxy magnesium, diethoxy magnesium, dipropoxy magnesium, dibutoxy magnesium, diphenoxy magnesium, ethoxymethoxy magnesium, ethoxypropoxy magnesium, butoxyethoxy magnesium, and the like. These dialkoxy magnesium compounds or diaryloxy magnesium compounds may be prepared by reacting metallic magnesium with an alcohol in the presence of a halogen or a halogen-containing metal compound.

A compound represented by the formula $Mg(OR^{14})D^2$, wherein $R^{14}$ represents an alkyl group having 1 to 10 carbon atoms and $D^2$ represents a halogen atom, is preferable as an alkoxyl magnesium halide. Specific examples are methoxy magnesium chloride, ethoxy magnesium chloride, propoxy magnesium chloride, butoxy magnesium chloride, and the like.

A compound represented by the formula $Mg(R^{15}COO)_2$, wherein $R^{15}$ represents a hydrocarbon group having 1 to 20 carbon atoms, is preferable as a fatty acid magnesium. Specific examples include magnesium laurate, magnesium stearate, magnesium octanoate, magnesium decanoate, and the like.

Among these magnesium compounds, dialkoxy magnesium compounds are preferred, with particularly preferred compounds being diethoxy magnesium and dipropoxy magnesium. The above magnesium compounds may be used either individually or in combination of two or more.

When a dialkoxy magnesium compound is used as the component (a) in the present invention, the dialkoxyl magnesium is either in the form of granules or powder, and either amorphous or spherical in the configuration. For example, when spherical dialkoxy magnesium is used, the resulting polymer is in the form of a powder having an excellent granular form and a narrow particle size distribution. This improves handling and processability of the polymer powder during polymerization operation and eliminates problems such as clogging caused by fine powders contained in the polymer powder.

The spherical dialkoxy magnesium need not necessarily be completely round in shape, but may be oval or potato-shaped. Specifically, the particles may have a ratio (l/w) of the major axis diameter (l) to the minor axis diameter (w) usually of 3 or less, preferably from 1 to 2, and more preferably from 1 to 1.5. Methods of producing such spherical dialkoxy magnesium are described in, for example, JP-A 58-41832/1983, JP-A 62-51633/1987, JP-A 3-74341/1991, JP-A 4-368391/1992, and JP-A 8-73388/1996.

The average particle size of the dialkoxy magnesium is usually from 1 to 200 $\mu$m, and preferably from 5 to 150 $\mu$m. In the case of spherical dialkoxy magnesium, the average particle size is usually from 1 to 100 $\mu$m, preferably from 5 to 50 $\mu$m, and more preferably from 10 to 40 $\mu$m. A powder having a narrow particle size distribution with a smaller fine and coarse powder content is preferably used. Specifically, the content of particles with a diameter of 5 $\mu$m or less is 20% or less, and preferably 10% or less. On the other hand, the content of particles with a diameter of 100 $\mu$m or more should be 10% or less, and preferably 5% or less. Moreover, the particle size distribution represented by ln(D90/D10), wherein D90 is a particle size at 90% of the integrated particle size and D10 is a particle size at 10% of the integrated particle size, is 3 or less, and preferably 2 or less.

In the present invention, although titanium tetrachloride (hereinafter referred to from time to time simply as "component (b)") is used in the preparation of the solid catalyst component (A) for the polymerization of olefins, titanium halides other than the titanium tetrachloride may also be used together with the titanium tetrachloride. As an example of the titanium halide compound which can be used together with the titanium tetrachloride, an alkoxyl titanium chloride of the formula $Ti(OR^{16})_nCl_{4-n}$, wherein $R^{16}$ indicates an alkyl group having 1 to 4 carbon atoms and n is an integer of $1 \leq n \leq 3$, can be given. These titanium halide compounds may be used either individually or in combination of two or more. Specific examples are $Ti(OCH_3)Cl_3$, $Ti(OC_2H_5)Cl_3$, $Ti(OC_3H_7)Cl_3$, $Ti(O-n-C_4H_9)Cl_3$, $Ti(OCH_3)_2Cl_2$, $Ti(OC_2H_5)_2Cl_2$, $Ti(OC_3H_7)_2Cl_2$, $Ti(O-n-C_4H_9)_2Cl_2$, $Ti(OCH_3)_3Cl$, $Ti(OC_2H_5)_3Cl$, $Ti(OC_3H_7)_3Cl$, $Ti(O-n-C_4H_9)_3Cl$, and the like.

Specific examples of phthalic acid diesters among the phthalic acid diesters and their derivatives (hereinafter referred to from time to time simply as "component (c)") which can be used in the preparation of the solid catalyst component (A) for the polmerization of olefins in the present invention include dimethyl phthalate, diethyl phthalate, di-n-propyl phthalate, di-iso-propyl phthalate, di-n-butyl phthalate, di-iso-butyl phthalate, ethylmethyl phthalate, methyl(iso-propyl)phthalate, ethyl(n-propyl)phthalate, ethyl(n-butyl)phthalate, ethyl(iso-butyl)phthalate, di-n-pentyl phthalate, di-iso-pentyl phthalate, dihexyl phthalate, di-n-heptyl phthalate, di-n-octyl phthalate, bis(2,2-dimethylhexyl)phthalate, bis(2-ethylhexyl) phthalate, di-n-nonyl phthalate, di-iso-decyl phthalate, bis(2,2-dimethylheptyl) phthalate, n-butyl(iso-hexyl phthalate, n-butyl(2-ethyl hexyl)phthalate, n-pentylhexyl phthalate, n-pentyl(iso-hexyl) phthalate, iso-pentyl(heptyl) phthalate, n-pentyl(2-ethylhexyl) phthalate, n-pentyl(iso-nonyl) phthalate, iso-pentyl(n-decyl) phthalate, n-pentylundecyl phthalate, iso-pentyl(iso-hexyl) phthalate, n-hexyl(2-ethylhexyl) phthalate, n-hexyl(iso-nonyl) phthalate, n-hexyl(n-decyl) phthalate, n-heptyl(2-ethylhexyl) phthalate, n-heptyl(iso-nonyl) phthalate, n-heptyl(iso-nonyl) phthalate, n-heptyl(neo-decyl) phthalate, and 2-ethylhexyl(iso-nonyl) phthalate.

These compounds may be used either individually or in combination of two or more. Of these, diethyl phthalate, di-n-propyl phthalate, di-iso-propyl phthalate, di-n-butyl phthalate, di-iso-butyl phthalate, di-n-octyl phthalate, bis(2-ethylhexyl) phthalate, and di-iso-decyl phthalate are particularly preferable. In addition to the above compounds, phthalic acid diesters and their derivatives of the following formula (3) are preferably used.

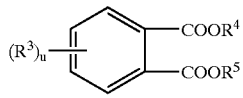
(3)

wherein $R^3$ is an alkyl group having 1 to 8 carbon atoms or a halogen atom, $R^4$ and $R^5$ individually may be either identical or different, representing an alkyl group having 1 to 12 carbon atoms, and u, which indicates the number of $R^3$, is 0, 1, or 2, provided that when u is 2, the two $R^3$ groups may be either identical or different, when u is 0, $R^4$ and $R^5$ are alkyl groups having a tertiary carbon atom and containing 4 to 8 carbon atoms.

In the phthalic acid diesters and their derivatives of the above formula (3), as specific examples of the groups represented by $R^3$, a methyl group, an ethyl group, a propyl group, an isopropyl group, a butyl group, an isobutyl group, a t-butyl group, a pentyl group, an iso-pentyl group, a neopentyl group, a fluorine atom, a chlorine atom, a bromine atom, and an iodine atom can be given. Of these, preferable groups are the methyl group, the bromine atom, and the fluorine atom, with the methyl group being particularly preferable. There are no specific limitations to the position of the substituent $R^3$. When the number u of the substituent $R^3$ is 1, the substituent $R^3$ preferably replace the hydrogen atom at the 3 or 4 position of the benzene ring. When the number u of the substituent $R^3$ is 2, the substituent $R^3$ preferably replace the hydrogen atom at the 4 and 5 positions of the benzene ring. As specific examples of the groups represented by $R^4$ or $R^5$ in the phthalic acid diester or the derivatives thereof shown by the above formula (3), a t-butyl group, a 2,2-dimethylpropyl group (neopentyl group), a 2,2-dimethylbutyl group, a 2,2-dimethylpentyl group, and a 2,2-dimethylhexyl group can be given. Of these groups, the t-butyl group and 2,2-dimethylpropyl group (neopentyl group) are particularly preferable, with an ideal group being 2,2-dimethylpropyl group (neopentyl group).

As specific examples of the phthalic acid diester or the derivatives thereof represented by the above formula (3), di-t-butyl phthalate, di-t-butyl 4-methylphthalate, di-t-butyl 4-ethylphthalate, di-t-butyl 4,5-dimethyl phthalate, di-t-butyl 4-bromophthalate, di-t-butyl 3-fluoro phthalate, dineopentyl phthalate, dineopentyl 3-methyl phthalate, dineopentyl 4-methylphthalate, dineopentyl 3-ethyl phthalate, dineopentyl 4-ethylphthalate, dineopentyl 4,5-dimethyl phthalate, dineopentyl 4,5-diethylphthalate, dineopentyl 3-fluorophthalate, dineopentyl 4-bromophthalate, dineopentyl 3-chlorophthalate, dineopentyl 4-chlorophthalate, t-butyl neopentyl 3-methylphthalate, t-butylneopentylphthalate, t-butylneopentyl 4-methylphthalate, t-butylneopentyl 3-ethylphthalate, t-butylneopentyl 4-ethylphthalate, t-butyl dineopentyl 4,5-dimethylphthalate, t-butylneopentyl 4,5-diethylphthalate, bis (2,2-dimethylbutyl)phthalate, bis(2,2-dimethylpentyl)phthalate, and bis(2,2-dimethyl hexyl) phthalate can be given. Of these compounds dineopentyl phthalate, dineopentyl 4-methylphthalate, t-butylneopentyl phthalate, dineopentyl 4-ethylphthalate, dineopentyl 4,5-dimethylphthalate, dineopentyl 4,5-diethyl phthalate, dineopentyl 3-fluorophthalate, dineopentyl 3-chlorophthalate, dineopentyl 4-chlorophthalate, and dineopentyl 4-bromo phthalate are preferable. These phthalic acid diesters and their derivatives may be used either individually or in combinations of two or more. The use of these phthalic acid diesters or their derivatives in the preparation of the solid catalyst component not only increases the catalyst activity, but also increases the activity of the catalyst to hydrogen. In a conventional catalyst, the catalyst activity to hydrogen declines as the activity and stereospecificity of the catalyst increase. The increase in the catalyst activity to hydrogen in the catalyst component of the present invention has made it possible to manufacture polymers with a higher melt-flow rate by using the same amount of hydrogen with or a smaller amount of hydrogen than the amount used in the conventional processes. The catalyst component of the present invention is thus applicable to the manufacture of polymers for injection molding of larger articles for which high fluidity (a high melt-flow rate) of molten polymers is required.

The phthalic acid diester derivatives of the component (c) shown by the above formula (3) can be prepared by various methods. A most simple method is reacting a commercially available phthalate with an alkyl halide, followed by hydrolysis of the resulting product. A number of synthetic methods of esters are known as described, for example, in "Lecture of Experimental Chemistry" (the fourth edition, vol. 22). Some examples are described here. A most common ester synthetic method comprises an application of the dehydration reaction of a carboxylic acid and alcohol. A mineral acid such as hydrochloric acid and sulfuric acid or a base such as triethylamine may be used as a catalyst. Another well-known method comprises use of a dehydrating agent for the synthesis of esters. For example, dicyclohexyl carbodiimide, trifluoroacetic acid anhydride, and the like are used as the dehydrating agent. A synthetic method using a carboxylic acid anhydride instead of carboxylic acid is also known. Moreover, a method of synthesizing an ester from an acid halide is known. This method is commonly used for the esterification of a carboxylic acid with a low reactivity due to steric hindrance, for example. For the synthesis of a carboxylic acid ester of a dibasic acid, a method of preparing an intermediate such as a mono-ester or half-ester, then obtaining a diester by directly esterifying this intermediate or via an acid halide is known. These methods and other known methods may be used.

In a specific synthesis method of dineopentyl 4-methyl phthalate, 4-methylphthalic acid and neopentyl alcohol are charged into a flask and refluxed for 2 hours in the presence of sulfuric acid. After completion of the reaction, the reaction mixture is allowed to cool to room temperature, and distilled water and ether are added to the mixture to extract the reaction product in the ether layer. After repetition of a washing procedure of the ether layer by flushing, an aqueous solution of sodium hydrogen carbonate is added, followed by neutralization of the water layer. A salt solution is added and the washing procedure using distilled water is repeated. Sodium sulfate is then added to the ether layer, followed by filtration. After removal of ether contained in the filtrate, ether is removed by distillation under vacuum. Distillation under vacuum is repeated to obtain a yellow liquid. The liquid is cooled and reprecipitated from ethanol to obtain white crystals.

The phthalic acid diester derivative thus obtained can be identified by the nuclear magnetic resonance spectroscopy ($^1$H-NMR), Raman spectrometry, mass spectrometry (MS), and the like.

The compound of the component ($d^1$) used for the preparation of the solid catalyst component (A) for the olefin polymerization (hereinafter referred to from time to time simply as "component (d¹)" is represented by the above-described formula (1). Such a compound includes the following four groups of compounds.

(1) Phenolic Compounds

Phenolic compounds used as the component (d¹) are hydroxyl group-containing hydrocarbon compounds having the structure of the formula (1), wherein n is 1 and $X^1$ is benzene. Preferable phenol compounds are hydroxyl group-containing hydrocarbon compounds having the structure of the formula (1), wherein $R^1$ is an alkyl group with 1 to 10 carbon atoms or a cycloalkyl group with 3 to 10 carbon atoms, n=1, and $X^1$ is a group obtainable by removing (m+n) hydrogen atoms from benzene.

In the phenol compound used as the component (d¹), preferable alkyl group substituents $R^1$ having 1 to 10 carbon atoms include a methyl group, an ethyl group, a n-propyl group, an isopropyl group, a n-butyl group, an isobutyl group, and a t-butyl group; preferable cycloalkyl group substituents $R^1$ having 3 to 10 carbon atoms include a cyclopentyl group and a cyclohexyl group; preferable halogen atom substituents $R^1$ are a fluorine atom, a bromine atom, and a chlorine atom; and the number (m) of the substituents $R^1$ is preferably 0 or 1. The substituents may replace the hydrogen atoms in any positions 2 to 6 in the benzene ring.

Specific phenol compounds of the component (d¹), which are hydroxyl group-containing hydrocarbon compounds having the structure of the formula (1), wherein $R^1$ is an alkyl group with 1 to 10 carbon atoms or a cycloalkyl group with 3 to 10 carbon atoms, n=1, and $X^1$ is a group obtainable by removing (m+n) hydrogen atoms from benzene include phenol, 2-methylphenol, 3-methylphenol, 4-methylphenol, 2-ethylphenol, 3-ethylphenol, 4-ethylphenol, 2-n-propylphenol, 2-iso-propylphenol, 3-n-propylphenol, 3-iso-propylphenol, 4-n-propylphenol, 4-iso-propylphenol, 2-n-butylphenol, 2-iso-butylphenol, 2-t-butylphenol, 3-n-butylphenol, 3-iso-butylphenol, 3-t-butylphenol, 4-n-butylphenol, 4-iso-butylphenol, 4-t-butylphenol, 2,4-dimethylphenol, 2,4-diethylphenol, 3-cyclopentylphenol, 3-cyclohexylphenol, 4-cyclopentylphenol, and 4-cyclohexylphenol. Of these, preferable phenols as the component (d) for the olefin polymerization catalyst are 3-methylphenol, 4-methylphenol, 3-ethylphenol, 4-ethylphenol, 4-n-propylphenol, 4-iso-propylphenol, 4-n-butylphenol, 4-iso-butylphenol, and 4-t-butylphenol.

Specific phenol compounds of the component (d¹), which are hydroxyl group-containing hydrocarbon compounds having the structure of the formula (1), wherein $R^1$ is a halogen atom, n=1, and $X^1$ is a group obtainable by removing (m+n) hydrogen atoms from benzene include 3-chlorophenol, 4-chlorophenol, 3-fluoro phenol, 4-fluorophenol, 3-bromophenol, 4-bromophenol, and the like.

These phenol compounds may be used either individually or in combination of two or more.

(2) Cyclic Alcohol Compounds

Cyclic alcohol compounds used as the component (d¹) are hydroxyl group-containing hydrocarbon compounds having the structure of the formula (1), wherein $X^1$ is a group obtainable by removing (m+n) hydrogen atoms from cyclopentane or cyclohexane. Preferable cyclic alcohol compounds are hydroxyl group-containing hydrocarbon compounds having the structure of the formula (1), wherein $R^1$ is an alkyl group with 1 to 5 carbon atoms or a halogen atom, n=2 or 3, and $X^1$ is a group obtainable by removing (m+n) hydrogen atoms from cyclopentane or cyclohexane.

The cyclic alcohol of the present invention is preferably a polyhydric cyclic alcohol as mentioned above. Particularly preferable polyhydric cyclic alcohols are dibasic alcohols with n=2 in the above formula. The number (m) of the substituents $R^1$ is preferably 0 or 1 and $R^1$ is preferably a methyl group, an ethyl group, a chlorine atom, a fluorine atom, or a bromine atom. When the number (n) of the hydroxyl groups is 2, the hydroxyl groups are in 1 and 2 positions of the $X^1$ group; and when n=3, the hydroxyl groups are in 1, 2, and 3 positions or 1, 2, and 4 positions of the $X^1$ group.

Specific cyclic alcohol compounds of the component (d¹), which are hydroxyl group-containing hydrocarbon compounds having the structure of the formula (1), wherein $R^1$ is an alkyl group with 1 to 5 carbon atoms or a halogen atom, n=2 or 3, and $X^1$ is a group obtainable by removing (m+n) hydrogen atoms from cyclopentane or cyclohexane include cis-1,2-cyclopentanediol, trans-1,2-cyclopentanediol, cis-1,2-cyclohexanediol, trans-1,2-cyclohexanediol, 4-methyl-cis-1,2-cyclohexanediol, 4-methyl-trans-1,2-cyclohexanediol, 3-bromo-1,2-cis-cyclohexanediol, 3-bromo-1,2-trans-cyclohexanediol, 1,2,3-cyclohexanetriol, 1,2,4-cyclohexanetriol, and the like. Of these, cis-1,2-cyclopentanediol, trans-1,2-cyclopentane diol, cis-1,2-cyclohexanediol, trans-1,2-cyclohexanediol, and 1,2,3-cyclohexanetriol are preferable, with a particularly preferable compound being cis-1,2-cyclohexanediol and trans-1,2-cyclohexanediol. These cyclic alcohol compounds may be used either individually or in combination of two or more.

As specific cyclic alcohol compounds of the component (d¹), which are hydroxyl group-containing hydrocarbon compounds having the structure of the formula (1), wherein $R^1$ is an alkyl group with 1 to 5 carbon atoms or a halogen atom, n=1, and $X^1$ is a group obtainable by removing (m+n) hydrogen atoms from cyclopentane or cyclohexane, cyclohexanol, 3-methyl cyclohexanol, 3-chlorocyclohexanol, and the like can be given. Of these, 3-methylcyclohexanol and 3-chlorocyclohexanol are preferable.

As specific cyclic alcohol compounds of the component (d¹), which are hydroxyl group-containing hydrocarbon compounds having the structure of the formula (1), wherein $R^1$ is a cycloalkyl group with 3 to 10 carbon atoms, the number (n) of the hydroxyl group is 1, 2, or 3, and $X^1$ is a group obtainable by removing (m+n) hydrogen atoms from cyclopentane or cyclohexane, 3-cyclopentylcyclohexanol, 3-cyclohexyl cyclohexanol, 3-cyclopentyl-1,2-cyclohexanediol, 4-cyclopentyl-1,2,3-cyclohexanetriol, and the like can be given.

(3) Benzene Diol or Benzene Triol Compounds

Benzene diol or benzene triol compounds used as the component (d¹) are hydroxyl group-containing hydrocarbon compounds having the structure of the formula (1), wherein the number (n) of the hydroxyl group is 2 or 3 and $X^1$ is a group obtainable by removing (m+n) hydrogen atoms from benzene.

In the benzene diol or benzene triol compounds used as the component (d¹), the number (n) of the substituent $R^1$ is preferably 0 or 1, with no specific limitations to the positions of the group $R^1$ on the benzene ring. Preferable alkyl group substituents $R^1$ having 1 to 10 carbon atoms are a methyl group, an ethyl group, and a t-butyl group; preferable cycloalkyl group substituents $R^1$ having 3 to 10 carbon atoms are a cyclopentyl group and cyclohexyl group; and preferable halogen atom substituents $R^1$ are a fluorine atom, a bromine atom, and a chlorine atom. The number (n) of hydroxyl groups on the benzene ring is 2 or 3, and preferably 2.

Specific examples of hydroxyl group-containing hydrocarbon compounds having the structure of the formula (1), wherein the number (n) of the hydroxyl group is 2 or 3 and $X^1$ is a group obtainable by removing (m+n) hydrogen atoms from benzene, used as a benzene diol or benzene triol compound as the component ($d^1$) include catechol, hydroquinone, pyrogallol, hydroxyhydroquinone, 3-methylcatechol, 4-methylcatechol, 3-ethylcatechol, 4-ethylcatechol, 3-n-propylcatechol, 4-n-propylcatechol, 3-iso-propylcatechol, 4-iso-propyl catechol, 3-n-butylcatechol, 4-n-butylcatechol, 3-iso-butyl catechol, 4-iso-butylcatechol, 3-t-butylcatechol, 4-t-butyl catechol, 3-n-pentylcatechol, 4-n-pentylcatechol, 3-iso-pentylcatechol, 4-iso-pentylcatechol, 3-iso-pentyl catechol, 4-iso-pentylcatechol, 3-neo-pentylcatechol, 4-neo-pentylcatechol, 3,5-di-t-butylcatechol, 4,5-di-t-butyl catechol, 4-methylpyrogallol, 5-methylpyrogallol, 4-ethyl pyrogallol, 5-ethylpyrogallol, 4-n-propylpyrogallol, 5-n-propylpyrogallol, 4-iso-propylpyrogallol, 5-iso-propyl pyrogallol, 4-n-butylpyrogallol, 5-n-butylpyrogallol, 4-iso-butylpyrogallol, 5-iso-butylpyrogallol, 4-t-butyl pyrogallol, 5-t-butylpyrogallol, 4-n-pentylpyrogallol, 5-n-pentylpyrogallol, 4-iso-pentylpyrogallol, 5-iso-pentyl pyrogallol, 4-t-pentylpyrogallol, 5-t-pentylpyrogallol, 4-neo-pentylpyrogallol, 5-neo-pentylpyrogallol, 3-methyl hydroxyhydroquinone, 5-methylhydroxyhydroquinone, 6-methyl hydroxyhydroquinone, 3-fluorocatechol, 4-fluorocatechol, 3-chlorocatechol, 4-chlorocatechol, 3-bromocatechol, 4-bromocatechol, 3-iodinecatechol, 4-iodinecatechol, 4-fluoropyrogallol, 5-fluoropyrogallol, 4-chloropyrogallol, 5-chloropyrogallol, 4-bromopyrogallol, 5-bromopyrogallol, 4-iodinepyrogallol, 5-iodinepyrogallol, 4-cyclopentyl catechol, and 4-cyclohexylcatechol. Of these compounds, the compounds having at least two hydroxyl groups bonded to a carbon atom adjacent to the benzene ring are preferable. Specific examples of such compounds are catechol, pyrogallol, 3-methyl catechol, 4-methylcatechol, 3-ethylcatechol, 4-ethylcatechol, 3-t-butylcatechol, 4-t-butylcatechol, 3-fluorocatechol, 4-fluorocatechol, 3-chlorocatechol, 4-chlorocatechol, 3-bromocatechol, 4-bromocatechol, 4,5-di-t-butylcatechol, 3,5-di-t-butylcatechol, 4-cyclopentylcatechol, and 4-cyclo hexylcatechol. These aromatic hydroxides can be used either individually or in combination of two or more. As particularly preferable examples of such compounds, catechol, pyrogallol, 3-methylcatechol, 4-methylcatechol, 3-fluorocatechol, 3,5-di-t-butylcatechol, and 4,5-di-t-butylcatechol can be given.

These compounds can be used either individually or in combination of two or more.

(4) Naphthalene Derivatives

Naphthalene derivatives used as the component ($d^1$) are hydroxyl group-containing hydrocarbon compounds having the structure of the formula (1), wherein $X^1$ is a group obtainable by removing (m+n) hydrogen atoms from naphthalene. Preferable naphthalene derivatives are hydroxyl group-containing hydrocarbon compounds having the structure of the formula (1), wherein $R^1$ is an alkyl group with 1 to 5 carbon atoms or a halogen atom, n=2 or 3, and $X^1$ is a group obtainable by removing (m+n) hydrogen atoms from naphthalene.

In the naphthalene derivatives of the component ($d^1$), the number (m) of the group $R^1$ is preferably 0 or 1, and preferable $R^1$ groups are a methyl group, an ethyl group, a fluorine atom, a chlorine atom, and a bromine atom, with the methyl group and the bromine atom being particularly preferable. Among the above the naphthalene derivatives, a naphthalene diol having two hydroxyl groups (n=2) and a substituted naphthalene diol having an alkyl group with 1 to 5 carbon atoms for $R^1$ or a halogen atom for the group $R^1$ are preferable. In terms of substitution positions of the hydroxyl groups, preferable naphthalene diols are a 1,2-diol, 1,8-diol, and 2,3-diol, and preferable naphthalene triols are a 1,2,3-triol and 2,3,8-triol. Of these, 1,2- and 2,3-diols of naphthalene are preferable, with the 2,3-diol being particularly preferable.

Specific naphthalene derivatives of the component ($d^1$), which are hydroxyl group-containing hydrocarbon compounds having the structure of the formula (1), wherein $R^1$ is an alkyl group with 1 to 5 carbon atoms or a halogen atom, n=2, and $X^1$ is a group obtainable by removing (m+n) hydrogen atoms from naphthalene include 1,2-naphthalenediol, 2,3-naphthalenediol, 5-methylnaphthalene-2,3-diol, 6-methylnaphthalene-2,3-diol, 5-methylnaphthalene-1,2-diol, 6-methylnaphthalene-1,2-diol, 5-ethylnaphthalene-2,3-diol, 6-ethylnaphthalene-2,3-diol, 5-ethylnaphthalene-1,2-diol, 6-ethylnaphthalene-1,2-diol, 5-fluoronaphthalene-2,3-diol, 6-fluoronaphthalene-2,3-diol, 5-fluoronaphthalene-1,2-diol, 6-fluoronaphthalene-1,2-diol, 5-chloronaphthalene-2,3-diol, 6-chloronaphthalene-2,3-diol, 5-chloronaphthalene-1,2-diol, 6-chloronaphthalene-1,2-diol, 5-bromonaphthalene-2,3-diol, 6-bromonaphthalene-2,3-diol, 5-bromonaphthalene-1,2-diol, 6-bromonaphthalene-1,2-diol, 6,7-dimethylnaphtalene-2,3-diol, 6,7-dibromonaphthalene-2,3-diol, 6-bromo-7-methylnaphthalene-2,3-diol, 6-methyl-7-bromonaphthalene-2,3-diol, 6,7-dimethylnaphtalene-1,2-diol, 6,7-dibromonaphthalene-1,2-diol, 6-bromo-7-methyl naphthalene-1,2-diol, 6-methyl-7-bromonaphthalene-1,2-diol, and the like. Of these, 2,3-naphthalenediol, 6-methyl naphthalene-2,3-diol, and 6-bromonaphthalene-2,3-diol are preferable, with a particularly preferable compound being 2,3-naphthalenediol. These naphthalenediols can be used either individually or in combination of two or more.

Specific naphthalene derivatives of the component ($d^1$), which are hydroxyl group-containing hydrocarbon compounds having the structure of the formula (1), wherein $R^1$ is an alkyl group with 1 to 5 carbon atoms or a halogen atom, n=3, and $X^1$ is a group obtainable by removing (m+n) hydrogen atoms from naphthalene include 1,2,3-naphthalenetriol, 6-methyl naphthalene-1,2,3-triol, 6-fluoronaphthalene-1,2,3-triol, 6-chloronaphthalene-1,2,3-triol, 6-bromonaphthalene-1, 2,3-triol, 1,2,8-naphthalenetriol, 6-methylnaphthalene-1,2,8-triol, 6-fluoronaphthalene-1,2,8-triol, 6-chloro naphthalene-1,2,8-triol, 6-bromonaphthalene-1,2,8-triol, and the like.

Specific naphthalene derivatives of the component ($d^1$), which are hydroxyl group-containing hydrocarbon compounds having the structure of the formula (1), wherein $R^1$ is a cycloalkyl group with 3 to 10 carbon atoms, n=2 or 3, and $X^1$ is a group obtainable by removing (m+n) hydrogen atoms from naphthalene include 5-cyclopentylnaphthalene-2,3-diol, 6-cyclopentyl naphthalene-2,3-diol, 5-cyclopentylnaphthalene-1,2-diol, 6-cyclopentylnaphthalene-1,2-diol, 5-cyclohexylnaphthalene-2,3-diol, 6-cyclohexylnaphthalene-2,3-diol, 5-cyclohexyl naphthalene-1,2-diol, 6-cyclohexylnaphthalene-1,2-diol, 6-cyclopentylnaphthalene-1,2,3-triol, 6-cyclohexyl naphthalene-1,2,3-triol, and the like.

Specific naphthalene derivatives of the component ($d^1$), which are hydroxyl group-containing hydrocarbon compounds having the structure of the formula (1), wherein $R^1$ is an alkyl group with 1 to 10 carbon atoms, a cycloalkyl group with 3 to 10 carbon atoms, or a halogen atom, n=1, and $X^1$ is a group obtainable by removing (m+n) hydrogen atoms from naphthalene include naphthol, 2-naphthol, 6-methylnaphthol, 6-methyl-2-naphthol, 6-chloronaphthol, 6-chloro-2-naphthol, 6-cyclohexyl naphthol, 6-cyclohexyl-2-naphthol, and the like.

The compound of the component ($d^2$) used for the preparation of the solid catalyst component (A) for the olefin polymerization (hereinafter referred to from time to time simply as "component ($d^2$)") is represented by the above-described formula (1). The following thiol compounds are preferably used.

(1) Thiols

The thiol compounds of the component ($d^2$) are compounds shown by the above formula (2). Mercapto group-containing hydrocarbon compounds having an alkyl group with 1 to 10 carbon atoms or a cycloalkyl group with 3 to 10 carbon atoms for $R^2$ in the formula (2) are preferably used. There are no specific limitations to the position of the substituent $R^2$ in the thiol compounds. Preferable alkyl group substituents $R^2$ having 1 to 10 carbon atoms are a methyl group, an ethyl group, an isopropyl group, and a t-butyl group; preferable cycloalkyl group substituents $R^2$ having 3 to 10 carbon atoms are a cyclopentyl group and a cyclohexyl group; s, which indicates the number of substituent $R^2$, is 0 or 1, and the number t of the substituent for the group SH is preferably 2.

Specific examples of the mercapto group-containing hydrocarbon compounds having an alkyl group with 1 to 10 carbon atoms or a cycloalkyl group with 3 to 10 carbon atoms for $R^2$ in the above formula (2) include thiophenol, 3-methylthiophenol, 4-methylthiophenol, 3-ethylthiophenol, 4-ethylthiophenol, 3,5-dimethylthiophenol, 1,2-benzenedithiol, 3-methylbenzene-1,2-dithiol, 4-methylbenzene-1,2-dithiol, 3-ethylbenzene-1,2-dithiol, 4-ethylbenzene-1,2-dithiol, 3-cyclopentyl thiophenol, 4-cyclopentylthiophenol, 3-cyclohexylthiophenol, 4-cyclohexylthiophenol, 3-cyclopentyl-benzene-1,2-dithiol, 4-cyclopentyl-benzene-1,2-dithiol, 3-cyclohexyl-benzene-1,2-dithiol, and 4-cyclohexyl-benzene-1,2-dithiol. Of these thiol compounds, dithiol compounds having two SH groups bonded to the carbon atom adjacent to the benzene ring are preferable. Specific examples include 1,2-benzenedithiol, 3-methyl benzen-1,2-dithiol, 4-methylbenzen-1,2-dithiol, 3-ethyl benzen-1,2-dithiol, 4-ethylbenzene-1,2-dithiol, 3-cyclo pentyl-benzene-1,2-dithiol, and 3-cyclohexyl-benzene-1,2-dithiol, with a particularly preferable compound being 1,2-benzenedithiol.

These aromatic thiol or dithiol compounds can be used either individually or in combination of two or more.

As mercapto group-containing hydrocarbon compounds having a halogen for $R^2$ in the formula (2), thiols such as 3-chlorothiophenol, 3-chlorobenzene-1,2-dithiol, 3-bromo thiophenol, 3-bromobenzene-1,2-dithiol, 4-bromothiophenol, 4-bromobenzene-1,2-dithiol, and the like can be given.

In addition to the above essential components, an aluminum compound and a metal salt of organic acid, or polysiloxane can be used for the preparation of the solid catalyst component (A) for the olefin polymerization. These components are effective for controlling crystal properties of product polymers.

As examples of the aluminum compound, aluminum trichloride, diethoxy aluminum chloride, di-iso-propoxy aluminum chloride, ethoxy aluminum dichloride, iso-propoxy aluminum dichloride, butoxy aluminum dichloride, triethoxy aluminum, and the like can be given.

As examples of the metal salt of organic acid, sodium stearate, magnesium stearate, and aluminum stearate can be given.

As polysiloxanes, chain-structured, partially hydrogenated, cyclic, or modified polysiloxanes which are liquid or viscous substances at an ordinary temperature can be given. As examples of chain-structured polysiloxanes, dimethyl polysiloxane and methylphenyl polysiloxane can be given; as partially hydrogenated polysiloxanes, methyl hydrogen polysiloxanes with a hydrogenation degree of 10 to 80% can be given; as cyclic polysiloxanes, hexamethyl-cyclopentane siloxane, 2,4,6-trimethylcyclotrisiloxane, 2,4,6,8-tetra methylcyclotetrasiloxane can be given; as modified polysiloxanes, higher fatty acid group-substituted dimethyl siloxane, epoxy group-substituted dimethyl siloxane, and polyoxyalkylene group-substituted dimethyl siloxane, and the like can be given.

The solid catalyst component (A) for olefin polymerization can be prepared by causing the component (a), component (b), component (c), and component ($d^1$) or component ($d^2$) (the component ($d^1$) and/or component ($d^2$) is hereinafter referred to from time to time as "component (d)") to come into contact. Although the contact may be carried out in the absence of an inert organic solvent, the presence of such a solvent is preferable for ease of processing. As inert organic solvents used here saturated hydrocarbons such as hexane, heptane, and cyclohexane, aromatic hydrocarbons such as benzene, toluene, xylene, and ethylbenzene, halogenated hydrocarbons such as orthodichlorobenzene, methylene chloride, carbon tetrachloride, and dichloroethane, can be given. Of these, aromatic hydrocarbons liquid at an ordinary temperature with a boiling point of 90 to 150° C., specifically toluene, xylene, and ethylbenzene are preferably used.

The following processes can be given as examples of the process for preparing solid catalyst component (A) for olefin polymerization of the present invention: a process comprising dissolving a magnesium compound of the above component (a) in an alcohol, a titanium compound, or the like, causing the resulting solution to come into contact with the component (b) or a mixture of the component (b) and component (c), causing a solid material to deposit by a heat treatment or the like, further causing the solid material to come into contact with the component (b), and causing an intermediate in any of these steps to come into contact with the component (d), thereby obtaining a solid component; and a process comprising suspending the component (a) in the component (b), an inert hydrocarbon solvent, or the like, causing the resulting suspension to come into contact with the component (c) or a mixture of the component (b) and component (c), further causing the mixture to come into contact with the component (b), and causing an intermediate in any of these steps to come into contact with the component (d), thereby obtaining the component (A).

Of the products produced by the two processes, particles of the solid catalyst component obtained by the former process are almost spherical and have a narrow particle size distribution. Spherical solid catalyst particles with a narrow particle size distribution can also be obtained using the latter process if a spherical magnesium compound is used. Such spherical solid catalyst particles with a narrow particle size distribution can also be obtained without using a spherical magnesium compound if particles are formed by a spray dry method in which a solution or suspension is sprayed and dried using a sprayer, for example.

In the preparation of the solid catalyst component (A) for olefin polymerization in the present invention, although the components (a) to (d) are caused to contact in any order, it is desirable for increasing the catalyst activity to cause the component (d) to come into contact with component (b), and then to cause the component (a) and/or component (c) to come into contact with the resulting product. When causing the component (d) to come into contact with component (b), one preferable method is to form a complex compound such as titanium tetrachloride and then causing the component (a) and/or component (c) to come into contact with the resulting product. It is desirable to cause the component (d) to come into contact with the component (b) in this manner. In order further to increase the activity solid catalyst component, causing the component (d) to come into contact with the component (b) after causing the components (a), (b), and (c) to come into contact with each other.

Contact of these components is carried out in a vessel equipped with a stirrer in an inert gas atmosphere from which water and the like have been removed while stirring. When the components are caused to contact by stirring the mixture or when a denaturing treatment is carried out by dispersing or suspending the components, the mixture is stirred at a comparatively low temperature of around the room temperature. When a reaction product is to be obtained by reacting the components after the contact, the stirring is preferably carried out at a temperature range of 40 to 130° C. The reaction does not sufficiently proceed at a reaction temperature below 40° C., resulting in a solid catalyst component with inadequate properties. On the other hand, control of the reaction becomes difficult at a temperature above 130° C. due to vaporization of the solvent and the like. The reaction time is one minute or more, preferably ten minutes or more, and still more preferably 30 minutes or more.

Examples of the process for preparing the solid catalyst component (A) for olefin polymerization will now be described.

(1) A process comprising dissolving magnesium chloride (a) in tetraalkoxy titanium, causing the solution to come into contact with polysiloxane, thereby producing a solid product, reacting this solid product with titanium tetrachloride (b) and the component (d), which had previously been contacted with the titanium tetrachloride (b), and then reacting the resulting reaction mixture with the component (c) to obtain the composition (A). Alternatively, the process may comprise dissolving magnesium chloride (a) in tetraalkoxy titanium, causing the solution to come into contact with polysiloxane, thereby producing a solid product, reacting this solid product with titanium tetrachloride (b), reacting the resulting reactant with the component (c), and further reacting with the component (d), which had previously been contacted with the titanium tetrachloride (b), thereby obtaining the composition (A). In this instance, it is possible to effect a preliminary polymerization reaction with the composition (A) using an organic aluminum compound, organosilane compound, and an olefin.

(2) A process comprising reacting anhydrous magnesium chloride (a) and 2-ethylhexyl alcohol to produce a homogeneous solution, causing phthalic anhydride to come into contact with this solution, then causing titanium tetrachloride (b) and the component (c) to come into contact with the resulting solution, thereby producing a solid product, and further causing this solid product to come into contact with the titanium tetrachloride (b) and the component (d), which had previously been contacted with the titanium tetrachloride (b), thereby obtaining the composition (A).

(3) A process comprising reacting metallic magnesium, butyl chloride, and dibutyl ether to synthesize an organic magnesium compound (a), catalytically reacting the organic magnesium compound (a) with tetrabutoxy titanium and tetraethoxy titanium to produce a solid product, and further catalytically reacting this solid product with the component (c), dibutyl ether, titanium tetrachloride (b), and the component (d), which had previously been contacted with titanium tetrachloride (b), thereby obtaining the composition (A). Alternatively, this process may comprise reacting metallic magnesium, butyl chloride, and dibutyl ether to synthesize an organic magnesium compound (a), catalytically reacting the organic magnesium compound (a) with tetrabutoxy titanium and tetraethoxy titanium to produce a solid product, catalytically reacting this solid product with the component (c), dibutyl ether, and titanium tetrachloride (b), and further catalytically reacting the component (d), which had previously been contacted with titanium tetrachloride (b), thereby obtaining the composition (A). In this instance, it is possible to effect a preliminary polymerization reaction with the solid component using an organic aluminum compound, organosilane compound, and an olefin to produce the composition (A).

(4) A process comprising catalytically reacting an organic magnesium compound (a) such as dibutyl magnesium and an organic aluminum compound with an alcohol such as butanol or 2-ethylhexyl alcohol, for example, in the presence of a hydrocarbon solvent to obtain a homogeneous solution, causing the solution to come into contact with a silicon compound such as $SiCl_4$, $HSiCl_3$, polysiloxane, or the like, thereby producing a solid product, catalytically reacting this solid product with titanium tetrachloride (b), the component (c), and the component (d), which had previously been contacted with the titanium tetrachloride (b), in the presence of an aromatic hydrocarbon solvent, and further causing the resulting reactant with titanium tetrachloride, thereby obtaining the composition (A). Alternatively, the process may comprise catalytically reacting an organic magnesium compound (a) such as dibutyl magnesium and an organic aluminum compound with an alcohol such as butanol or 2-ethylhexyl alcohol, for example, in the presence of a hydrocarbon solvent to obtain a homogeneous solution, causing the solution to come into contact with a silicon compound such as $SiCl_4$, $HSiCl_3$, polysiloxane, or the like, thereby producing a solid product, catalytically reacting this solid product with titanium tetrachloride (b) and the component (c) in the presence of an aromatic hydrocarbon solvent, catalytically reacting the resulting reactant with titanium tetrachloride (b) and the component (d), which had previously been contacted with the titanium tetrachloride (b), and further causing the resulting product with titanium tetrachloride, thereby obtaining the composition (A).

(5) A process comprising catalytically reacting magnesium chloride (a), tetraalkoxy titanium, and an aliphatic alcohol in the presence of an aliphatic hydrocarbon compound to produce a homogeneous solution, adding titanium tetrachloride (b) to the solution, followed by heating to cause a solid product to precipitate, causing the component (c) to come into contact with the solid product, and further causing the resulting product to come into contact with titanium tetrachloride (b) and the component (d), which had previously been contacted with the titanium tetrachloride (b), thereby obtaining the composition (A).

(6) A process comprising catalytically reacting metallic magnesium powder, an alkyl mono-halogen compound, and iodine, catalytically reacting the resulting mixture with tetraalkoxy titanium, an acid halide, and an aliphatic alcohol in the presence of an aliphatic hydrocarbon to produce a homogeneous solution (a), adding titanium tetrachloride (b)

to the solution, followed by heating to cause a solid product to precipitate, causing the component (c) to come into contact with the solid product, and further causing the resulting product to come into contact with titanium tetrachloride (b) and the component (d), which had previously been contacted with the titanium tetrachloride (b), thereby obtaining the composition (A).

(7) A process comprising suspending diethoxy magnesium (a) in alkylbenzene or a halogenated hydrocarbon solvent, causing the suspension to come into contact with titanium tetrachloride (b), then heating and causing the mixture to come into contact with the component (c), thereby producing a solid product, washing this solid product with alkylbenzene, and again causing the solid product to come into contact with titanium tetrachloride (b) and the component (d), which had previously been contacted with the titanium tetrachloride (b), in the presence of alkylbenzene to obtain the composition (A). In this instance, said solid component may be heated in the presence or absence of a hydrocarbon solvent to produce the composition (A).

(8) A process comprising suspending diethoxy magnesium (a) in alkylbenzene, catalytically reacting the suspension to come into contact with titanium tetrachloride (b) and the component (c), thereby producing a solid product, washing this solid product with alkylbenzene, and again causing the solid product to come into contact with titanium tetrachloride (b) and the component (d), which had previously been contacted with the titanium tetrachloride (b), to obtain the composition (A). In this instance, said solid component may be caused to come into contact two times or more with titanium tetrachloride (b) and the component (d), which had previously been contacted with the titanium tetrachloride (b), in the presence of alkylbenzene to obtain the composition (A).

(9) A process comprising pulverizing diethoxy magnesium (a), calcium chloride, and a silicon compound shown by a formula $Si(OR^{17})_4$, wherein $R^{17}$ represents an alkyl group or aryl group, suspending the resulting pulverized solid product in an aromatic hydrocarbon, catalytically reacting the suspension with titanium tetrachloride (b) and the component (c), then causing the resulting product to come into contact with titanium tetrachloride (b) and the component (d), which had previously been contacted with the titanium tetrachloride (b), thereby obtaining the composition (A).

(10) A process comprising suspending diethoxy magnesium (a) and the component (c) in alkylbenzene, adding the suspension to and reacting with titanium tetrachloride (b), thereby producing a solid product, washing this solid product with alkylbenzene, and causing the solid product to come into contact with titanium tetrachloride (b) and the component (d), which had previously been contacted with the titanium tetrachloride (b), in the presence of alkylbenzene to obtain the composition (A).

(11) A process comprising catalytically reacting a halogenation calcium, an aliphatic magnesium such as stearic acid magnesium (a), titanium tetrachloride (b), and the component (c), and causing the resulting product to come into contact with titanium tetrachloride (b) and the component (d), which had previously been contacted with the titanium tetrachloride (b) to obtain the composition (A).

(12) A process comprising suspending diethoxy magnesium (a) in alkylbenzene or a halogenated hydrocarbon solvent, causing the suspension to come into contact with titanium tetrachloride (b), then heating and catalytically reacting the mixture with the component (c), thereby producing a solid product, washing this solid product with alkylbenzene, and again causing the solid product with titanium tetrachloride (b) and the component (d), which had previously been contacted with the titanium tetrachloride (b), in the presence of alkylbenzene, wherein the process further comprises a step of causing aluminum chloride in any one of the steps of suspension, contact, or catalytic reaction, thereby obtaining the composition (A).

(13) A process comprising catalytically reacting diethoxy magnesium (a), 2-ethylhexyl alcohol, and carbon dioxide in the presence of toluene to produce a homogeneous solution, catalytically reacting the solution with titanium tetrachloride (b) and the component (c) to obtain a solid product, dissolving the solid product in tetrahydrofuran, causing a solid product to precipitate, catalytically reacting the resulting solid product with titanium tetrachloride (b) and the component (d), which had previously been contacted with the titanium tetrachloride (b), optionally repeating the catalytically reaction of the titanium tetrachloride (b) and the component (d), which had previously been contacted with the titanium tetrachloride (b), thereby obtaining the composition (A). A silicon compound such as tetrabutoxysilane can be used in any one of the steps of contact, catalytic reaction, and dissolution in this process.

(14) A process comprising suspending magnesium chloride (a), an organic epoxy compound, and a phosphoric acid compound in a hydrocarbon solvent such as toluene, heating the suspension to produce homogeneous solution, catalytically reacting this solution with phthalic anhydride and titanium tetrachloride to obtain a solid product, causing the solid product to come into contact with the component (c) and react these components, washing the resulting reaction product with alkylbenzene, and again causing the reaction product with titanium tetrachloride (b) and the component (d), which had previously been contacted with the titanium tetrachloride (b), in the presence of alkylbenzene to obtain the composition (A).

(15) A process comprising catalytically reacting dialkoxy magnesium (a), titanium compound, and the component (c) in the presence of toluene, catalytically reacting the resulting product with a silicon compound such as polysiloxanes, again catalytically reacting the titanium tetrachloride (b), catalytically reacting a metal salt of an organic acid, and causing the resulting product to come into contact with titanium tetrachloride (b) and the component (d), which had previously been contacted with the titanium tetrachloride (b), in the presence of alkylbenzene, to obtain the composition (A).

A preferable embodiment of the process for preparing solid catalyst component (A) for olefin polymerization based on the above processes (1) to (15) is as follows. A suspension is prepared by suspending dialkoxy magnesium, for example, as a component (a) in an aromatic hydrocarbon compound which is liquid at an ordinary temperature. Next, titanium tetrachloride, as a component (b), is caused to come into contact with this suspension at a temperature from −20 to 100° C., preferably from −10 to 70° C., and more preferably from 0 to 30° C., and reacted at a temperature from 40 to 130° C., and preferably from 70 to 120° C. In this instance, the component (c) is caused to come into contact with the suspension at a temperature from −20 to 130° C., either before or after the titanium tetrachloride is contacted, thereby obtaining a solid reaction product. After washing with an aromatic hydrocarbon compound which is liquid at an ordinary temperature, this solid reaction product is again caused to come into contact with titanium tetrachloride and the component (d), which had previously been contacted with the titanium tetrachloride, in the presence of an aromatic hydrocarbon compound such as toluene at a temperature from 40 to 130° C., and preferably from 70 to 120° C., from 1 to 12 times. The resulting product is again washed with a hydrocarbon compound which is liquid at an ordinary temperature to obtain the catalyst component (A) for olefin polymerization.

The ratio of the compounds used for the preparation of the catalyst component (A) cannot be generically defined, because such a ratio varies according to the process employed. For example, the component (b) is used in an amount from 0.5 to 100 mols, preferably from 0.5 to 50 mols, still more preferably from 1 to 10 mols; the component (c) is used in an amount from 0.01 to 10 mols, preferably from 0.01 to 1 mol, and still more preferably from 0.02 to 0.6 mol; and the component (d) is used in an amount from 0.0005 to 1 mol, preferably from 0.0005 to 0.5 mol, and still more preferably from 0.001 to 0.1 mol; for one mol of the component (a). The amount of the component (d) which is to be previously contacted with the component (b) is from 0.00002 to 0.05 mol, and preferably from 0.0001 to 0.01 mol, for one mol of the component (b).

The solid catalyst component (A) for olefin polymerization thus prepared contains magnesium, titanium, the component (c), the component (d), and a halogen atom. Although the content of each component is not specifically limited, a preferable content of the magnesium, titanium, component (c), component (d), and halogen atom is respectively 10 to 30 wt %, 1 to 5 wt %, 1 to 20 wt %, 0.05 to 2 wt %, and 40 to 70 wt %.

The compounds represented by the above formula (4) can be given as the organoaluminum compound (B) (hereinafter referred to from time to time simply as "component (B)") which can be used for preparing the solid catalyst component (A) for the polymerization of olefins in the present invention. As specific examples of such organoaluminum compounds (B), triethyl aluminum, diethyl aluminum chloride, tri-iso-butyl aluminum, diethyl aluminum bromide, and diethyl aluminum hydride can be given. These compounds may be used either individually or in combination of two or more. Triethyl aluminum and tri-iso-butyl aluminum are preferably used.

The compounds represented by the above formula (5) can be given as the organosilicon compound (C) (hereinafter referred to from time to time simply as "component (C)") which can be used for preparing the solid catalyst component (A) for the polymerization of olefins in the present invention. As examples of such an organosilicon compound, phenylalkoxysilane, alkylalkoxysilane, phenylalkylalkoxysilane, cycloalkylalkoxysilane, and cycloalkylalkylalkoxysilane can be given.

The following compounds can be given as specific examples of such organosilicon compounds: trimethylmethoxysilane, trimethylethoxysilane, tri-n-propylmethoxysilane, tri-n-propylethoxysilane, tri-n-butylmethoxysilane, tri-iso-butyl methoxysilane, tri-t-butylmethoxysilane, tri-n-butyl ethoxysilane, tricyclohexylmethoxysilane, tricyclohexyl ethoxysilane, cyclohexyldimethylmethoxysilane, cyclohexyl diethylmethoxysilane, cyclohexyldiethylethoxysilane, dimethyldimethoxysilane, dimethyldiethoxysilane, di-n-propyl dimethoxysilane, di-iso-propyldimethoxysilane, di-n-propyl diethoxysilane, di-iso-propyldiethoxysilane, di-n-butyl dimethoxysilane, di-iso-butyldimethoxysilane, di-t-butyl dimethoxysilane, di-n-butyldiethoxysilane, n-butylmethyl dimethoxysilane, bis(2-ethylhexyl) dimethoxysilane, bis(2-ethylhexyl)diethoxysilane, dicyclopentyldimethoxy silane, dicyclopentyldiethoxysilane, dicyclohexyldimethoxy silane, dicyclohexyldiethoxysilane, bis(3-methylcyclohexyl) dimethoxysilane, bis(4-methylcyclohexyl)dimethoxysilane, bis(3,5-dimethylcyclohexyl)dimethoxysilane, cyclohexyl cyclopentyldimethoxysilane, cyclohexylcyclopentyl diethoxysilane, cyclohexylcyclopentyldipropoxysilane, 3-methylcyclohexylcyclopentyldimethoxysilane, 4-methyl cyclohexylcyclopentyldimethoxysilane, 3,5-dimethyl cyclohexylcyclopentyldimethoxysilane, 3-methyl cyclohexylcyclohexyldimethoxysilane, 4-methylcyclohexyl cyclohexyldimethoxysilane, 3,5-dimethylcyclohexyl cyclohexyldimethoxysilane, cyclopentylmethyldimethoxysilane, cyclopentylmethyldiethoxysilane, cyclopentylethyl diethoxysilane, cyclopentyl(iso-propyl)dimethoxysilane, cyclopentyl(iso-butyl)dimethoxysilane, cyclohexylmethyl dimethoxysilane, cyclohexylmethyldiethoxysilane, cyclohexylethyldimethoxysilane, cyclohexylethyl diethoxysilane, cyclohexyl(n-propyl)dimethoxysilane, cyclohexyl(iso-propyl)dimethoxysilane, cyclohexyl(n-propyl) diethoxysilane, cyclohexyl(iso-butyl) dimethoxysilane, cyclohexyl(n-butyl)diethoxysilane, cyclohexyl(n-pentyl) dimethoxysilane, cyclohexyl(n-pentyl)diethoxysilane, diphenyldimethoxysilane, diphenyldiethoxysilane, phenyl methyldimethoxysilane, phenylmethyldiethoxysilane, phenyl ethyldimethoxysilane, phenylethyldiethoxysilane, methyl trimethoxysilane, methyltriethoxysilane, ethyltrimethoxy silane, ethyltriethoxysilane, n-propyltrimethoxysilane, iso-propyltrimethoxysilane, n-propyltriethoxysilane, iso-propyltriethoxysilane, n-butyltrimethoxysilane, iso-butyltrimethoxysilane, t-butyltrimethoxysilane, n-butyltriethoxysilane, 2-ethylhexyltrimethoxysilane, 2-ethylhexyltriethoxysilane, cyclopentyltrimethoxysilane, cyclopentyltriethoxysilane, cyclohexyltrimethoxysilane, cyclohexyltriethoxysilane, vinyltrimethoxysilane, vinyl triethoxysilane, phenyltrimethoxysilane, phenyltriethoxy silane, tetramethoxysilane, tetraethoxysilane, tetrapropoxy silane, and tetrabutoxysilane. Of these, preferable compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexyleth-yldimethoxy silane, cyclohexylethyldiethoxysilane, dicyclopentyl dimethoxysilane, dicyclopentyldiethoxysilane, cyclopentyl methyldimethoxysilane, cyclopentylmethyldiethoxysilane, cyclopentylethyldiethoxysilane, cyclohexylcyclopentyl dimethoxysilane, cyclohexylcyclopentyldiethoxysilane, 3-methylcyclohexylcyclopentyldimethoxysilane, 4-methyl cyclohexylcyclopentyldimethoxysilane, and 3,5-dimethyl cyclohexylcyclopentyldimethoxysilane. Either one type of these organosilicon compounds (C) or a combination of two or more types of these compounds can be used in the present invention.

The olefin polymerization catalyst of the present invention comprises the above-described solid catalyst component (A) for olefin polymerization, the organoaluminum compound (B), and the organosilicon compound (C). Polymerization or copolymerization of olefins is carried out in the presence of this catalyst. As olefins, ethylene, propylene, 1-butene, 1-pentene, 4-methyl-1-pentene, vinyl cyclohexane, and the like can be used either individually or in combination of two or more. Of these, ethylene, propylene, and 1-butene can be suitably used. A particularly preferable olefin is propylene. Propylene may be copolymerized with other olefins. As copolymerized olefins, ethylene, 1-butene, 1-pentene, 4-methyl-1-pentene, vinyl cyclohexane, and the like can be used either individually or in combination of two or more. Of these, ethylene and 1-butene can be suitably used.

The ratio of each component used is not specifically limited inasmuch as such a ratio does not affect the effect of the present invention. Usually, the component (B) is used in the amount of 1 to 2000 mols, and preferably 50 to 1000 mols, per one mol of titanium atom in the component (A). The component (C) is used in the amount of 0.002 to 10 mols, preferably 0.01 to 2 mols, and more preferably 0.01 to 0.5 mol, per one mol of the component (B).

Although the order of contact of these compositions is optional, it is desirable to first add the organoaluminum compound (B) to the polymerization system, then causing the organosilicon compound (C) to come into contact with the organoaluminum compound (B), and causing the solid catalyst component (A) to come into contact with the resulting mixture.

The polymerization of the present invention can be carried out either in the presence or absence of an organic solvent. Olefin monomers such as propylene may be used either in a gaseous or liquid state. The polymerization reaction is preferably carried out at a temperature 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the olefin polymerization catalyst containing the composition (A), component (B), and component (C), it is desirable to preliminary polymerize the olefins prior to the main polymerization reaction to improve the catalytic activity, stereoregularity, properties of resulting polymer particles, and the like. In addition to the olefins used in the main polymerization reaction, monomers such as styrene can be used in the preliminary polymerization.

Although the order of contact of the components and monomers in carrying out the preliminary polymerization is optional, it is desirable to first add the organoaluminum compound (B) to the preliminary polymerization system in an inert gas or olefin gas atmosphere, cause the composition (A) for olefin polymerization to come into contact with the organoaluminum compound (B), and then cause one or more olefins such as propylene to come into contact with the mixture. When the preliminary polymerization is carried out in combination with the organosilicon compound (C), it is desirable to first add the organoaluminum compound (B) to the preliminary polymerization system in an inert gas or olefin gas atmosphere, then causing the organosilicon compound (C) to come into contact with the organoaluminum compound (B), and cause the composition (A) for olefin polymerization to come into contact with the resulting mixture, and then cause one or more olefins such as propylene to come into contact with the mixture.

The polymerization of olefins in the presence of the olefin polymerization catalyst prepared by the process of the present invention can produce olefin polymers in a higher yield than in the polymerization using a conventional catalyst, while maintaining a higher stereoregularity of the polymer.

EXAMPLES

The present invention will be described in more detail by way of examples, which are explained in comparison with comparative examples.

Preparation Example 1

A 2.0 l three-necked flask equipped with a reflux condenser was charged with 25.0 g of 4-methyl phthalate and 100.0 g of neopentyl alcohol. 18 ml of sulfuric acid was slowly added at 66° C., followed by refluxing for two hours at 115 to 125° C. After cooling, the reaction solution was transferred to a separating funnel containing 150 ml of distilled water. The flask was washed with 200 ml of diethyl ether and the diethyl ether washing liquid was also poured into the separating funnel. After a flushing operation, an operation of removing the water layer (lower layer) was repeated three times. After the addition of 150 ml of a 5% aqueous solution of sodium hydrogen carbonate, a flushing operation was carried out to confirm that the water layer has a pH in the range of 7 to 8. After removing the water layer, the residue was washed with 300 ml of saturated brine and then with 150 ml of distilled water. The water layer was removed. The ether layer (upper layer) was transferred to an Erlenmeyer flask and dehydrated using anhydrous sodium sulfate. After removal of ether by distillation under reduced pressure, the residue was further distilled under reduced pressure. 13.0 g of a viscous yellow liquid was obtained at a column top temperature of 190° C. This liquid was cooled to about −10° C. to obtain white crystals, which were recrystallized from ethanol to obtain 11.8 g of highly pure white crystals (yield: 26.5%). As a result of analysis using the following MS analyzer, $^1$H-NMR analyzer, and Raman spectroscopic analyzer, the white crystals were identified to be dineopentyl 4-methyl phthalate. The results of the analyses are shown in Tables 1 to 3.

<Analyzers>

The Finigan Mat (GC-MS) was used for the MS analysis. The JEOL GSX270 and a $CDCl_3$ solvent were used for the $^1$H-NMR analysis. The JEOL RFT800 was used for the Raman spectroscopic analysis.

Preparation Example 2

A 2.0 l three-necked flask equipped with a reflux condenser was charged with 50.0 g of 4-bromo phthalate and 100.1 g of neopentyl alcohol. 36 ml of sulfuric acid was slowly added at 69° C., followed by refluxing for three and a half hours at 115 to 125° C. After cooling, the reaction solution was transferred to a separating funnel containing 600 ml of distilled water. The flask was washed with 500 ml of diethyl ether and the diethyl ether washing liquid was also poured into the separating funnel. After a flushing operation, an operation of removing the water Layer (lower layer) was repeated three times. After the addition of 250 ml of a 5% aqueous solution of sodium hydrogen carbonate, a flushing operation was carried out to confirm that the water layer has a pH in the range of 7 to 8. After removing the water layer, the residue was washed with 300 ml of saturated brine and then with 150 ml of distilled water. The water layer was removed. The ether layer (upper layer) was transferred to an Erlenmeyer flask and dehydrated using anhydrous sodium sulfate. After removal of ether by distillation under reduced pressure, the residue was further distilled under reduced pressure. 61.9 g of a viscous pale yellow liquid was obtained at a column top temperature of 170° C. This liquid was cooled to about −10° C. to obtain white crystals, which were recrystallized from ethanol to obtain 33.2 g of highly pure white crystals (yield: 39.2%). As a result of analysis carried out in the same manner as above, the white crystals were identified to be dineopentyl 4-bromo phthalate. The results of the analyses are shown in Tables 1 to 3.

Preparation Example 3

A 2.0 l three-necked flask equipped with a reflux condenser was charged with 24.0 g of 3-fluoro phthalate and 99.6 g of neopentyl alcohol. 18 ml of sulfuric acid was slowly added at 62° C., followed by refluxing for two hours at 115 to 125° C. After cooling, the reaction solution was transferred to a separating funnel containing 300 ml of distilled water. The flask was washed with 210 ml of diethyl ether and the diethyl ether washing liquid was also poured into the separating funnel. After a flushing operation, an operation of removing the water layer (lower layer) was repeated three times. After the addition of 150 ml of a 5% aqueous solution of sodium hydrogen carbonate, a flushing operation was carried out to confirm that the water layer has a pH in the range of 7 to 8. After removing the water layer, the residue was washed with 150 ml of saturated brine and then with 150 ml of distilled water. The water layer was removed. The ether layer (upper layer) was transferred to an Erlenmeyer flask and dehydrated using anhydrous sodium sulfate. After removal of ether by distillation under reduced pressure, the residue was further distilled under reduced pressure. 15.3 g of a viscous pale yellow liquid was obtained at a column top temperature of 150° C. This liquid was crystallized from ethanol to obtain 12.0 g of highly pure white crystals (yield: 28.4%). As a result of analysis carried out in the same manner as above, the white crystals were identified to be dineopentyl 3-fluoro phthalate. The results of the analyses are shown in Tables 1 to 3.

Preparation Example 4

A 2.0 l three-necked flask equipped with a reflux condenser was charged with 21.1 g of 4,5-dimethyl phthalate and 99.7 g of neopentyl alcohol. 18 ml of sulfuric acid was slowly added at 67° C., followed by refluxing for two hours at 115 to 125° C. After cooling, the reaction solution was transferred to a separating funnel containing 300 ml of distilled water. The flask was washed with 210 ml of diethyl ether and the diethyl ether washing liquid was also poured into the separating funnel. After a flushing operation, an operation of removing the water layer (lower layer) was repeated three times. After the addition of 150 ml of a 5% aqueous solution of sodium hydrogen carbonate, a flushing operation was carried out to confirm that the water layer has a pH in the range of 7 to 8. After removing the water layer, the residue was washed with 150 ml of saturated brine and then with 100 ml of distilled water. The water layer was removed. The ether layer (upper layer) was transferred to an Erlenmeyer flask and dehydrated using anhydrous sodium sulfate. After removal of ether by distillation under reduced pressure, the residue was further distilled under reduced pressure. 18.9 g of a viscous yellow liquid was obtained at a column top temperature of 170° C. This liquid was crystallized from ethanol to obtain 12.1 g of highly pure white crystals (yield: 36.7%). As a result of analysis carried out in the same manner as above, The white crystals were identified to be dineopentyl 4,5-dimethyl phthalate. The results of the analyses are shown in Tables 1 to 3.

TABLE 1

| Preparation Example | Compound | MS (Mw/z) Molecular peak | Characteristic peak |
|---|---|---|---|
| 1 | Dineopentyl 4-methyl phthalate | 320 | 163 |
| 2 | Dineopentyl 4-bromo phthalate | 384, 386 | 184, 182 |
| 3 | Dineopentyl 3-fluoro phthalate | 324 | 167 |
| 4 | Dineopentyl 4,5-dimethyl phthalate | 334 | 177 |

TABLE 2

| Preparation Example | Compound | $^1$H-NMR (ppm:lnt) | | | |
|---|---|---|---|---|---|
| | | Methyl al | Methyl ar | Methylene | Aromatic ring |
| 1 | Dineopentyl 4-methyl phthalate | 1.0 s:18.1 | 2.4 s:3.0 | 4.0 s:4.0 | 7.3–7.7 m:3.0 |
| 2 | Dineopentyl 4-bromo phthalate | 1.0 s:18.0 | — | 4.0 d:4.0 | 7.6–7.8 m:3.0 |
| 3 | Dineopentyl 3-fluoro phthalate | 1.0 d:18.0 | — | 4.0 s:2.0 / 4.1 s:2.0 | 7.3–7.8 m:3.0 |
| 4 | Dineopentyl 4,5-dimethyl phthalate | 1.0 s:18.0 | 2.4 s:6.0 | 4.0 s:4.0 | 7.6 s:2.0 |

TABLE 3

| Preparation Example | Compound | Raman (cm$^{-1}$) | | | Elemental analysis (%) Found/Theoretical | | |
|---|---|---|---|---|---|---|---|
| | | C=O | C-Car | Cal-H | C | H | O |
| 1 | Dineopentyl 4-methyl phthalate | 1724 | 1612 | 2963 / 2923 | 71.1/ 71.2 | 8.8/ 8.8 | 20.0/ 20.0 |
| 2 | Dineopentyl 4-bromo phthalate | 1730 | 1593 | 2962 / 2940 | 56.1/ 56.1 | 6.2/ 6.5 | 16.6/ 16.6 |
| 3 | Dineopentyl 3-fluoro phthalate | 1728 | 1610 | 2960 / 2908 | 66.7/ 66.6 | 8.1/ 7.8 | 20.2/ 19.7 |

TABLE 3-continued

| Preparation | | Raman (cm$^{-1}$) | | | Elemental analysis (%) Found/Theoretical | | |
|---|---|---|---|---|---|---|---|
| Example | Compound | C=O | C-Car | Cal-H | C | H | O |
| 4 | Dineopentyl 4,5-dimethyl phthalate | 1720 | 1613 | 2965 2927 | 71.8/ 71.8 | 8.9/ 9.0 | 19.2/ 19.1 |

Example 1

<Preparation of Solid Catalyst Component (A)>

A 500 ml round bottom flask equipped with a stirrer, of which the internal atmosphere had been sufficiently replaced by nitrogen gas, was charged with 10 g of diethoxy magnesium and 80 ml toluene to prepare a suspension. After the addition of 20 ml of titanium tetrachloride, the suspension was heated, and when the temperature increased to as high as 80° C., 3.4 ml of di-n-butyl phthalate was added and the mixture was heated to 110° C. Then, the mixture was reacted for one hour while stirring at 110° C. After the reaction, the resulting reaction mixture was washed three times with 100 ml of toluene at 90° C. A solution, previously prepared by adding 0.094 g of phenol to a mixture of 20 ml of titanium tetrachloride and 80 ml of toluene, and stirring the mixture for one hour at room temperature, was added to the washed reaction mixture. The resulting mixture was heated to 110° C. and reacted for one hour while stirring. After the reaction, the resulting reaction mixture was washed seven times with 100 ml of n-heptane at 40° C., thereby obtaining a solid catalyst component (A). The liquid in the solid catalyst component was separated from the solid components. The content of titanium in the solid components was determined to confirm that the content was 2.8 wt %.

<Preparation of Polymerization Catalyst and Polymerization>

A 2.0 l autoclave equipped with a stirrer, of which the internal atmosphere had been entirely replaced by nitrogen gas, was charged with 1.32 mmol of triethylaluminum, 0.13 mmol of cyclohexylcyclopentyldimethoxysilane, and the above solid catalyst component (A) in an amount, in terms of the titanium atom contained therein, of 0.0026 mmol, thereby forming a polymerization catalyst. Then, with the addition of 2.0 l of hydrogen gas and 1.4 l of liquid propylene, the preliminary polymerization was carried out for 5 minutes at 20° C., following which the preliminary polymerization product was heated and the main polymerization was carried out for one hour at 70° C. The polymerization activity per 1 g of the solid catalyst component was 46,200 g-PP/g-cat. The melt index (MI) of the polymer (a), determined by the test method according to ASTM D1238 or JIS K7210, was 3.2 g/10 min.

The polymerization activity per 1 g of the solid catalyst component used here was calculated by the following formula: The polymerization activity=(a) 206.0 (g)/solid catalyst component 0.00446 (g)

The polymer (b) insoluble in n-heptane determined by extracting this polymer for 6 hours in boiling n-heptane was 203.7 g, confirming that the proportion of the boiling n-heptane insoluble matters in the polymer was 98.9 wt %. The results of polymerization are also shown in Table 4.

Example 2

<Preparation of Solid Catalyst Component (A) for Olefin Polymerization>

A solid catalyst component (A) for olefin polymerization was prepared in the same manner as in Example 1, except for using 0.12 g of trans-1,2-cyclohexanediol instead of 0.094 g of phenol. The liquid in the solid catalyst component was separated from the solid components. The content of titanium in the solid components was determined to confirm that the content was 2.9 wt %.

<Preparation of Polymerization Catalyst and Polymerization>

Polymerization was carried out in the same manner as in Example 1, except for using the solid catalyst component prepared above. The polymerization activity per 1 g of the solid catalyst component was 51,100 g-PP/g-cat. The melt index (MI) of the polymer (a), determined by the test method according to ASTM D1238 or JIS K7210, was 7.9 g/10 min. The polymerization activity per 1 g of the solid catalyst component used here was calculated by the following formula:

The polymerization activity=(a)224.0 (g)/solid catalyst component 0.00438 (g)

The polymer (b) insoluble in n-heptane determined by extracting this polymer for 6 hours in boiling n-heptane was 220.2 g, confirming that the proportion of the boiling n-heptane insoluble matters in the polymer was 98.5 wt %. The results of polymerization are also shown in Table 4.

Example 3

<Preparation of Solid Catalyst Component (A)>

A solid catalyst component (A) for olefin polymerization was prepared in the same manner as in Example 1, except for using 0.14 g of 1,2-benzene dithiol instead of 0.094 g of phenol. The liquid in the solid catalyst component was separated from the solid components. The content of titanium in the solid components was determined to confirm that the content was 3.7 wt %.

<Preparation of Polymerization Catalyst and Polymerization>

Polymerization was carried out in the same manner as in Example 1, except for using the solid catalyst component prepared above. The polymerization activity per 1 g of the solid catalyst component was 45,700 g-PP/g-cat. The melt index (MI) of the polymer (a), determined by the test method according to ASTM D1238 or JIS K7210, was 8.9 g/10 min. The polymerization activity per 1 g of the solid catalyst component used here was calculated by the following formula:

The polymerization activity=($a$)155.5 (g)/solid catalyst component 0.00340 (g)

The polymer (b) insoluble in n-heptane determined by extracting this polymer for 6 hours in boiling n-heptane was 152.5 g, confirming that the proportion of the boiling n-heptane insoluble matters in the polymer was 98.1 wt %. The results of polymerization are also shown in Table 4.

Example 4

<Preparation of Solid Catalyst Component (A)>

A solid catalyst component (A) for olefin polymerization was prepared in the same manner as in Example 1, except for using 0.11 g of catechol instead of 0.094 g of phenol. The liquid in the solid catalyst component was separated from the solid components. The content of titanium in the solid components was determined to confirm that the content was 3.3 wt %.

<Preparation of Polymerization Catalyst and Polymerization>

Polymerization was carried out in the same manner as in Example 1, except for using the solid catalyst component prepared above. The polymerization activity per 1 g of the solid catalyst component was 52,100 g-PP/g-cat. The melt index (MI) of the polymer (a), determined by the test method according to ASTM D1238 or JIS K7210, was 6.5 g/10 min.

The polymerization activity per 1 g of the solid catalyst component used here was calculated by the following formula:

The polymerization activity=(a)200.1(g)/solid catalyst component 0.00384 (g)

The polymer (b) insoluble in n-heptane determined by extracting this polymer for 6 hours in boiling n-heptane was 197.5 g, confirming that the proportion of the boiling n-heptane insoluble matters in the polymer was 98.7 wt %. The polymerization activity per 1 g of the solid catalyst component, the heptane insoluble matters (HI), and the melt index (MI) are shown in Table 1.

Example 5

The same experiment as in Example 4 was carried out, except for using 0.13 g of pyrogallol instead of catechol. The content of titanium in the resulting solid catalyst component was 3.7 wt %. The results of polymerization are also shown in Table 4.

Example 6

The same experiment as in Example 4 was carried out, except for using 0.12 g of 4-methylcatechol instead of catechol. The content of titanium in the resulting solid catalyst component was 3.8 wt %. The results of polymerization are also shown in Table 4.

Example 7

The same experiment as in Example 4 was carried out, except for using 0.13 g of 3-fluorocatechol instead of catechol. The content of titanium in the resulting solid catalyst component was 3.2 wt %. The results of polymerization are also shown in Table 4.

Example 8

The same experiment as in Example 4 was carried out, except for using 0.22 g of 3,5-di-t-butylcatechol instead of catechol. The content of titanium in the resulting solid catalyst component was 2.7 wt %. The results of polymerization are also shown in Table 4.

Example 9
<Preparation of Solid Catalyst Component (A)>

A 500 ml round bottom flask equipped with a stirrer, of which the internal atmosphere had been sufficiently replaced by nitrogen gas, was charged with 10 g of diethoxy magnesium and 80 ml toluene to prepare a suspension. After the addition of 20 ml of titanium tetrachloride, the suspension was heated, and when the temperature increased to as high as 80° C., 3.0 g of di-n-butyl phthalate was added and the mixture was heated to 110° C. Then, the mixture was reacted for one hour while stirring at 110° C. After the reaction, the resulting reaction mixture was washed three times with 100 ml of toluene at 90° C. A solution, previously prepared by adding 0.16 g of 2,3-naphthalene diol to a mixture of 20 ml of titanium tetrachloride and 80 ml of toluene, and stirring the mixture for one hour at room temperature, was added to the washed reaction mixture. The resulting mixture was heated to 110° C. and reacted for one hour while stirring. After the reaction, the resulting reaction mixture was washed seven times with 100 ml of n-heptane at 40° C., thereby obtaining a solid catalyst component. The liquid in the solid catalyst component was separated from the solid components. The content of titanium in the solid components was determined to confirm that the content was 3.2 wt %.

<Preparation of Polymerization Catalyst and Polymerization>

Polymerization was carried out in the same manner as in Example 1, except for using the solid catalyst component prepared above. The results of polymerization are also shown in Table 4.

Comparative Example 1

The same experiment as in Example 1 was carried out except that phenol was not added. The content of titanium in the resulting solid catalyst component was 2.9 wt %. The polymerization activity per 1 g of the solid catalyst component was 42,400 g-PP/g-cat. The proportion of boiling n-heptane insoluble matters in the polymer was 98.7 wt %, and the melt index was 6.6 g/10 minutes.

TABLE 4

|  | Polymerization activity (g-PP/g-cat.) | Ti content (Wt %) | HI (Wt %) | MI (g/100 min) |
| --- | --- | --- | --- | --- |
| Example 1 | 46,200 | 2.8 | 98.9 | 3.2 |
| Example 2 | 51,100 | 2.9 | 98.5 | 7.9 |
| Example 3 | 45,700 | 3.7 | 98.1 | 8.9 |
| Example 4 | 52,100 | 3.3 | 98.7 | 6.5 |
| Example 5 | 51,900 | 3.7 | 98.1 | 8.2 |
| Example 6 | 50,600 | 3.8 | 98.2 | 9.5 |
| Example 7 | 47,500 | 3.2 | 98.4 | 7.9 |
| Example 8 | 52,100 | 2.7 | 98.1 | 7.3 |
| Example 9 | 52,800 | 3.2 | 98.6 | 6.3 |
| Comparative Example 1 | 42,400 | 2.9 | 98.7 | 6.6 |

Example 10
<Preparation of Solid Catalyst Component (A)>

A 500 ml round bottom flask equipped with a stirrer, of which the internal atmosphere had been sufficiently replaced by nitrogen gas, was charged with 10 g of diethoxy magnesium and 80 ml toluene to prepare a suspension. After the addition of 20 ml of titanium tetrachloride, the suspension was heated, and when the temperature increased to as high as 80° C., a solution prepared by dissolving 3.5 g of dineopentyl 4-methyl phthalate, prepared in the Preparation Example 1, in 3.5 ml of toluene was added and the mixture was heated to 110° C. Then, the mixture was reacted for one hour while stirring at 110° C. After the reaction, the resulting reaction mixture was washed three times with 100 ml of toluene at 90° C. A solution prepared by dissolving 20 ml of titanium tetrachloride and 0.11 g of catechol in 80 ml of toluene was added, the resulting mixture was heated to 110° C., followed by the reaction for one hour while stirring. This reaction was further repeated twice. After the reaction, the resulting reaction mixture was washed seven times with 100 ml of n-heptane at 40° C., thereby obtaining a solid catalyst component. The liquid in the solid catalyst component was separated from the solid components. The content of titanium in the solid components was determined to confirm that the content was 3.7 wt %.

<Preparation of Polymerization Catalyst and Polymerization>

A 2.0 l autoclave equipped with a stirrer, of which the internal atmosphere had been entirely replaced by nitrogen gas, was charged with 1.98 mmol of triethylaluminum, 0.13 mmol of cyclohexylcyclopentyldimethoxysilane, and the above solid catalyst component (A) in an amount, in terms of the titanium atom contained therein, of 0.00178 mmol, thereby forming a polymerization catalyst. Then, with the addition of 2.0 l of hydrogen gas and 1.4 l of liquid propylene, the preliminary polymerization was carried out for 5 minutes at 20° C., following which the preliminary polymerization product was heated and the main polymerization was carried out for one hour at 70° C. The polymerization activity per 1 g of the solid catalyst component was 107,300 g-PP/g-cat. The melt index (MI) of the polymer (a), determined by the test method according to ASTM D1238 or JIS K7210, was 22 g/10 min.

The polymerization activity per 1 g of the solid catalyst component used here was calculated by the following formula:

The polymerization activity=$(a)247.8(g)$/solid catalyst component 0.00231 (g)

The polymer (b) insoluble in n-heptane determined by extracting this polymer for 6 hours in boiling n-heptane was 240.0 g, confirming that the proportion of the boiling n-heptane insoluble matters in the polymer was 96.9 wt %. The results of polymerization are also shown in Table 5.

Example 11

A 500 ml round bottom flask equipped with a stirrer, of which the internal atmosphere had been sufficiently replaced by nitrogen gas, was charged with 10 g of diethoxy magnesium and 80 ml toluene to prepare a suspension. After the addition of 20 ml of titanium tetrachloride, the suspension was heated, and when the temperature increased to as high as 80° C., a solution prepared by dissolving 3.4 g of dineopentyl phthalate in 10.2 ml of toluene was added and the mixture was heated to 110° C. Then, the mixture was reacted for one hour while stirring at 110° C. After the reaction, the resulting reaction mixture was washed three times with 100 ml of toluene at 90° C. A solution prepared by dissolving 20 ml of titanium tetrachloride and 0.11 g of catechol in 80 ml of toluene was added, the resulting mixture was heated to 110° C., followed by the reaction for one hour while stirring. This reaction was further repeated four times. After the reaction, the resulting reaction mixture was washed seven times with 100 ml of n-heptane at 40° C., thereby obtaining a solid catalyst component. The liquid in the solid catalyst component was separated from the solid components. The content of titanium in the solid components was determined to confirm that the content was 3.0 wt %. Polymerization was carried out in the same manner as in Example 10 using this catalyst. The results of polymerization are also shown in Table 5.

Example 12

A solid catalyst component was prepared in the same manner as in Example 10, except for using a solution of 3.6 g of dineopentyl 4,5-dimethyl phthalate, prepared in Preparation Example 4, dissolved in 5.8 ml of toluene instead of the solution of 3.5 g of dineopentyl 4-methyl phthalate in 3.5 ml of toluene. A polymerization catalyst was prepared from the solid catalyst component and polymerization was carried out using the catalyst. The content of titanium in the resulting solid catalyst component was 2.8 wt %. The results of polymerization are also shown in Table 5.

Example 13

A solid catalyst component was prepared in the same manner as in Example 10, except for using a solution of 3.2 g of t-butylneopentyl phthalate dissolved in 9.6 ml of toluene instead of the solution of 3.5 g of dineopentyl 4-methyl phthalate in 3.5 ml of toluene. A polymerization catalyst was prepared from the solid catalyst component and polymerization was carried out using the catalyst. The content of titanium in the resulting solid catalyst component was 3.8 wt %. The results of polymerization are also shown in Table 5.

Example 14

A solid catalyst component was prepared in the same manner as in Example 10, except for using a solution of 4.2 g of dineopentyl 4-bromo phthalate, prepared in Preparation Example 2, dissolved in 5.3 ml of toluene instead of the solution of 3.5 g of neopentyl 4-methyl phthalate in 3.5 ml of toluene. A polymerization catalyst was prepared from the solid catalyst component and polymerization was carried out using the catalyst. The content of titanium in the resulting solid catalyst component was 3.0 wt %. The results of polymerization are also shown in Table 5.

Example 15

A solid catalyst component was prepared in the same manner as in Example 11, except for using a solution of 3.5 g of dineopentyl 3-fluoro phthalate, prepared in Preparation Example 3, dissolved in 4.7 ml of toluene instead of the solution of 3.4 g of dineopentyl phthalate in 10.2 ml of toluene. A polymerization catalyst was prepared from the solid catalyst component and polymerization was carried out using the catalyst. The content of titanium in the resulting solid catalyst component was 3.2 wt %. The results of polymerization are also shown in Table 5.

Example 16

The same experiment as in Example 11 was carried out, except for using 0.22 g of 4,5-di-t-butylcatechol instead of 0.11 g of catechol. The content of titanium in the resulting solid catalyst component was 2.7 wt %. The results of polymerization are also shown in Table 5.

TABLE 5

|  | Polymerization activity (g-PP/g-cat.) | HI (wt %) | MI (g/10 min) |
| --- | --- | --- | --- |
| Example 10 | 107,300 | 97.8 | 22.0 |
| Example 11 | 143,800 | 97.9 | 8.6 |
| Example 12 | 110,200 | 98.0 | 25.0 |
| Example 13 | 122,600 | 98.0 | 19.0 |
| Example 14 | 109,600 | 97.9 | 28.0 |
| Example 15 | 137,000 | 97.6 | 23.0 |
| Example 16 | 127,900 | 98.5 | 9.9 |

As can be seen from the above results, olefin polymers can be obtained in an extremely high yield by polymerizing olefins using the solid catalyst component and the catalyst of the present invention.

Industrial Applicability

The catalyst for polymerization of olefins of the present invention can produce olefin polymers in a very high yield while retaining high stereoregularity of the olefin polymers. The catalyst is thus expected not only to produce polyolefins for common use at a low cost, but also to be useful in the manufacture of copolymer olefins having high functions.

What is claimed is:

1. A solid catalyst component for polymerization of olefins, comprising:

(a) a dialkoxy magnesium compound, (b) titanium tetrachloride, (c) a phthalic acid diester or a derivative thereof, and ($d^1$) a hydroxyl group-containing hydrocarbon compound having the following formula (1):

$$(R^1)_m X^1 (OH)_n \qquad (1)$$

wherein $R^1$ is an alkyl group having 1 to 10 carbon atoms, a cycloalkyl group having 3 to 10 carbon atoms or a halogen atom, m, which represents the number of groups $R^1$, is 0, 1, or 2, wherein when m is 2, the two $R^1$ groups may be either identical or different, n, which indicates the number of hydroxyl groups, is 2 or 3, and $X^1$ represents a group obtainable by removing (m+n) hydrogen atoms from benzene, cyclopentane, cyclohexane or naphthalene.

2. A solid catalyst component for polymerization of olefins comprising (a) a dialkoxy magnesium compound, (b) titanium tetrachloride, (c) a phthalic acid diester or a derivative thereof, and ($d^2$) a mercapto group-containing hydrocarbon compound having the following formula (2):

$$(R^2)_s X^2 (SH)_t \qquad (2)$$

wherein $R^2$ is an alkyl group having 1 to 10 carbon atoms, a cycloalkyl group having 3 to 10 carbon atoms or a halogen atom, s, which represents the number of group $R^2$, indicates 0, 1, or 2, wherein when s is 2, the two $R^2$ groups may be either identical or different, t, which indicates the number of mercapto groups, is 1 or 2, and $X^2$ represents a group obtainable by removing (s+t) hydrogen atoms from benzene provided that when t is 1, s is 1 or 2.

3. The solid catalyst component for polymerization of olefins according to claim 1, wherein the component ($d^1$) is a hydroxyl group-containing hydrocarbon compound having the structure of formula (1), wherein $R^1$ is cycloalkyl group having 3 to 10 carbon atoms, m, which indicates the number of groups $R^1$, is 1 or 2, n, which indicates the number of hydroxyl groups, is 1, and $X^1$ is a group obtainable by removing (m+n) hydrogen atoms from benzene.

4. The solid catalyst component for polymerization of olefins according to claim 1, wherein the component ($d^1$) is a hydroxyl group-containing hydrocarbon compound having the structure of formula (1), wherein $R^1$ is alkyl group having 1 to 5 carbon atoms or a halogen atom, n, which indicates the number of the hydroxyl groups, is 2 or 3, and $X^1$ is a group obtainable by removing (m+n) hydrogen atoms from cyclopentane or cyclohexane.

5. The solid catalyst component for polymerization of olefins according to claim 1, wherein the component ($d^1$) is a hydroxyl group-containing hydrocarbon compound having the structure of formula (1), wherein n, which indicates the number of the hydroxyl groups, is 2 or 3 and $X^1$ is a group obtainable by removing (m+n) hydrogen atoms from benzene.

6. The solid catalyst component for polymerization of olefins according to claim 1, wherein the component ($d^1$) is a hydroxyl group-containing hydrocarbon compound having the structure of formula (1), wherein $R^1$ is alkyl group having 1 to 5 carbon atoms or a halogen atom, n, which indicates the number of the hydroxyl groups, is 2 or 3, and $X^1$ is a group obtainable by removing (m+n) hydrogen atoms from naphthalene.

7. The solid catalyst component for polymerization of olefins according to claim 1 or claim 2, wherein the component (c) is a phthalic acid diester or the derivative thereof represented by the following formula (3),

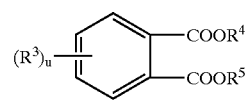

(3)

wherein $R^9$ is an alkyl group having 1 to 8 carbon atoms or a halogen atom, $R^4$ and $R^5$ may be either identical or different, individually representing an alkyl group having 1 to 12 carbon atoms, and u, which indicates the number of $R^3$, is 0, 1, or 2, provided that when u is 2, the two $R^3$ groups may be either identical or different, when u is 0, $R^4$ and $R^5$ are alkyl groups having a tertiary carbon atom and containing 4 to 8 carbon atoms.

8. A catalyst for polymerization of olefin comprising:

(A) the solid catalyst component according to claim 1 or claim 2, (B) an organoaluminum compound of the following formula (4), $$R^6 p AlQ_{3-p} \qquad (4)$$

wherein $R^6$ is an alkyl group having 1 to 4 carbon atoms, Q is a hydrogen atom or a halogen atom, and p is a real number satisfying an inequality $0 < p \leq 3$, and (C) an organosilicon compound of the following general formula (5):

$$R^7_q Si(OR^8)_{4-q} \qquad (5)$$

wherein $R^7$ may be either identical or different, individually representing an alkyl group having 1 to 12 carbon atoms, a cycloalkyl group, a phenyl group, a vinyl group, an allyl group, or an aralkyl group, $R^8$ may be either identical or different, individually representing an alkyl group having 1 to 4 carbon atoms, a cycloalkyl group, a phenyl group, a vinyl group, an allyl group, or an aralkyl group, and q is an integer satisfying the inequality of $0 \leq q \leq 3$.

9. A solid catalyst component for polymerization of olefins comprising (a) a dialkoxy magnesium compound, (b) titanium tetrachloride, (c) a phthalic acid diester or a derivative thereof, and ($d^1$) a hydroxyl group-containing hydrocarbon compound having the following formula (1):

$$(R^1)_x X^1 (OH)_n \qquad (1)$$

wherein $R^1$ is an alkyl group having 1 to 10 carbon atoms, a cycloalkcyl group having 3 to 10 carbon atoms, or a halogen atom, m, which indicates the number of $R^1$, is 0, 1, or 2, provided that when m is 2, the two $R^1$ groups may be either identical or different, n, which indicates the number of the OH group, is 2 or 3, and $X^1$ represents a group obtainable by removing (m+n) hydrogen atoms from benzene, cyclopentane, cyclohexane, or naphthalene, wherein the solid catalyst component is formed by contacting components (a), (b), and (c) with each other, and then contacting component ($d^1$) with the resulting product in the presence of component (b).

10. A solid catalyst component for polymerization of olefins comprising (a) a dialkoxy magnesium compound, (b) titanium tetrachloride, (c) a phthalic acid diester or a derivative thereof, and ($d^2$) a mercapto group-containing hydrocarbon compound having the following formula (2):

$$(R^2)_a X^2 (SH)_t \quad (2)$$

wherein $R^2$ is an alkyl group having 1 to 10 carbon atoms, a cycloalkyl group having 3 to 10 carbon atoms, or a halogen atom, s, which indicates the number of $R^2$, is 0, 1, or 2, provided that when s is 2, the two $R^2$ groups may be either identical or different, t, which indicates the number of mercapto groups, is 1 or 2, and $X^2$ represent a group obtainable by removing (s+t) hydrogen atoms from benzene.

11. A catalyst for polymerization of olefins, comprising:

(A) the solid catalyst component according to claim 9 or claim 10, (B) an organoaluminum compound of the following formula (4):

$$R^6_p AlQ_{3-p} \quad (4)$$

wherein $R^6$ is an alkyl group having 1 to 4 carbon atoms, Q is a hydrogen atom or a halogen atom, and p is a real number the satisfying inequality $0<p\leq 3$, and (C) an organosilicon compound of the following formula (5):

$$R^7_q Si(OR^8)_{4-q} \quad (5)$$

wherein $R^7$ may be either identical or different, individually representing an alkyl group having 1 to 12 carbon atoms, a cycloalkyl group, a phenyl group, a vinyl group, an alkyl group or an aralkyl group, $R^8$ may be either identical or different, individually representing an alkyl group having 1 to 4 carbon atoms, a cycloalkyl group, a phenyl group, a vinyl group, an alkyl group or an aralkyl group, and q is an integer satisfying the inequality of $0\leq q\leq 3$.

12. The solid catalyst component for polymerization of olefins according to claim 1, 2, 9 or 10, wherein the dialkoxy magnesium compound (a) has a particle size of 1 to 200 $\mu$m.

13. The solid catalyst component for polymerization of olefins according to claim 12, wherein the dialkoxy magnesium compound (a) has a particle size of 5 to 150 $\mu$m.

14. The solid catalyst component for polymerization of olefins according to claim 1, 2, 9 or 10, wherein the phthalic acid diester (c) is dimethyl phthalate, diethyl phthalate, di-n-propyl phthalate, di-iso-propyl phthalate, di-n-butyl phthalate, di-iso-butyl phthalate, methylethyl phthalate, methyl(iso-propyl)phthalate, ethyl(n-propyl)phthalate, ethyl (n-butyl)phthalate, ethyl(iso-butyl)phthalate, di-n-pentyl phthalate, di-iso-pentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, di-iso-decyl phthalate, bis(2,2-dimethylheptyl) phthalate, n-butyl(iso-hexyl phthalate, -butyl(2-ethyl hexyl)phthalate, n-pentylhexyl phthalate, n-pentyl(iso-hexyl) phthalate, iso pentyl(heptyl) phthalate, n-pentyl(2-ethylhexyl) phthalate, n-pentyl(iso-nonyl) phthalate, iso-pentyl(n-decyl) phthalate, n-pentylundecyl phthalate, iso-pentyl(iso-hexyl) phthalate, n-hexyl(2-ethylhexyl) phthalate, n-hexyl(iso-nonyl) phthalate, n-hexyl (n-decyl) phthalate, n-heptyl(2-ethylhexyl) phthalate, n-heptyl(iso-nonyl) phthalate, n-heptyl(iso-nonyl) phthalate, n-heptyl(neo-decyl) phthalate or 2-ethylhexyl(iso-nonyl) phthalate.

* * * * *